United States Patent
Amitai

(10) Patent No.: US 12,210,154 B2
(45) Date of Patent: Jan. 28, 2025

(54) METHOD FOR MANUFACTURING SUBSTRATE-GUIDED ELEMENTS FOR COMPACT HEAD-MOUNTED DISPLAY SYSTEM

(71) Applicant: OORYM OPTICS LTD., Rehovot (IL)

(72) Inventor: Yaakov Amitai, Rehovot (IL)

(73) Assignee: OORYM OPTICS LTD., Rehovot (IL)

( * ) Notice: Subject to any disclaimer, the term of this patent is extended or adjusted under 35 U.S.C. 154(b) by 132 days.

(21) Appl. No.: 18/025,508

(22) PCT Filed: Sep. 2, 2021

(86) PCT No.: PCT/IL2021/051084
§ 371 (c)(1),
(2) Date: Mar. 9, 2023

(87) PCT Pub. No.: WO2022/054047
PCT Pub. Date: Mar. 17, 2022

(65) Prior Publication Data
US 2023/0350201 A1 Nov. 2, 2023

(30) Foreign Application Priority Data

Sep. 10, 2020 (IL) .......................................... 277285

(51) Int. Cl.
G02B 27/01 (2006.01)
(52) U.S. Cl.
CPC .... *G02B 27/0149* (2013.01); *G02B 2027/015* (2013.01)
(58) Field of Classification Search
CPC .. G02B 6/0065; G02B 6/0055; G02B 6/0018; G02B 2027/0125; G02B 6/00;
(Continued)

(56) References Cited

U.S. PATENT DOCUMENTS

2008/0278812 A1 11/2008 Amitai
2017/0363799 A1* 12/2017 Ofir .......................... G02B 6/00
2019/0227215 A1* 7/2019 Danziger ............. G02B 27/283

FOREIGN PATENT DOCUMENTS

JP 2010170606 A 8/2010
WO WO-2017141242 A2 * 8/2017 ......... G02B 27/0172

OTHER PUBLICATIONS

European Patent Office, European International Search Report and Written Opinion of the International Searching Authority, PCT/IL2021/051084, Nov. 30, 2021, 10 pages.

* cited by examiner

*Primary Examiner* — Vishal I Patel
(74) *Attorney, Agent, or Firm* — Snell & Wilmer LLP

(57) ABSTRACT

A method for manufacturing an optical device having a light wave transmitting substrate with at least two major surfaces, edges and an output coupling-out reflecting element carried by the substrate forming a substrate allowing light-waves to traverse the substrate between the two major surfaces, includes (a) attaching to each other a plurality of flat plates of a selected thickness, each having at least two parallel main surfaces and two edges arranged in an unlimited first periodic stack (175) having at least two surfaces (104U, 4D) parallel to the main surfaces of the plates and edges (105R, 105L); (b) slicing the stack to form a plurality of slices (178) defining slicing lines (107), wherein the stack is oriented such that for the majority of the stacked plates, the slicing lines cross at least two edges of the plate; (c) grinding or polishing the slice to form a substrate with two major surfaces, and a coupling-out reflecting element, wherein the major surfaces are parallel to each other and not parallel to the coupling-out reflecting element, and (d) cutting the substrate to final dimensions.

20 Claims, 19 Drawing Sheets

(58) Field of Classification Search
CPC .... G02B 6/0076; G02B 27/017; G02B 6/003; G02B 27/0081
See application file for complete search history.

METHOD FOR MANUFACTURING SUBSTRATE-GUIDED ELEMENTS FOR COMPACT HEAD-MOUNTED DISPLAY SYSTEM

FIELD OF THE INVENTION

The present invention relates to substrate-based light wave guided optical devices, and particularly to devices which include reflecting surfaces carried by a light-transmissive substrate, and to a method for manufacturing such an optical device.

The invention can be implemented to advantage in a large number of imaging applications, such as, head-mounted and head-up displays, as well as cellular phones, compact displays, and 3-D displays.

BACKGROUND OF THE INVENTION

One of the important applications for compact optical elements is in head-mounted displays (HMDs), wherein an optical module serves both as an imaging lens and a combiner, in which a two-dimensional display is imaged to infinity and reflected into the eye of an observer. The display can be obtained directly from either a spatial light modulator (SLM), such as a cathode ray tube (CRT), a liquid crystal display (LCD), an organic light emitting diode array (OLED), a scanning source and similar devices, indirectly, by means of a relay lens, or an optical fiber bundle. The display comprises an array of elements (pixels) imaged to infinity by a collimating lens and transmitted into the eye of the observer by means of a reflecting or partially reflecting surface acting as a combiner for non-see-through and see-through applications, respectively. Typically, a conventional, free-space optical module is used for these purposes. As the desired field-of-view (FOV) of the system increases, such a conventional optical module becomes larger, heavier and bulkier, and therefore, even for a moderate performance device, is impractical. This is a major drawback for all kinds of displays but especially in HMDs, wherein the system should be as light and compact as possible.

The need for compactness has led to several different complex optical solutions, all of which, on the one hand, are still not sufficiently compact for most practical applications, and on the other hand, suffer major drawbacks in terms of manufacturability, price and performance.

The teachings included in Publication Numbers WO2017/141239, WO2017/141240, WO2017/141242, WO2019/077601, WO2020/157747 and IL 276466 are herein incorporated by reference.

SUMMARY OF THE INVENTION

The present invention facilitates the provision of compact substrates for, amongst other applications, HMDs. The invention allows relatively wide FOVs together with relatively large eye-motion box (EMB) values. The resulting optical system offers a large, high-quality image, which also accommodates large movements of the eye. The optical system according to the present invention is particularly advantageous because it is substantially more compact than state-of-the-art implementations, and yet it can be readily incorporated, even into optical systems having specialized configurations.

A broad object of the present invention is, therefore, to alleviate the drawbacks of state-of-the-art compact optical display devices and to provide other optical components and systems having improved performance, according to specific requirements, and to provide a method for manufacturing such an optical device.

In accordance with the present invention, there is provided a method for manufacturing an optical device having a light wave transmitting substrate with at least two major surfaces, edges and an output coupling-out reflecting element carried by the substrate, forming a substrate allowing light-waves to traverse the substrate between the two major surfaces, the method comprising: a. attaching to each other a plurality of flat plates of a selected thickness, each having each at least two parallel main surfaces and two edges arranged in an unlimited first periodic stack having at least two surfaces parallel to the main surfaces of the plates and edges; b. slicing the stack to form a plurality of slices defining slicing lines, wherein the stack is oriented such that for the majority of the stacked plates, the slicing lines cross at least wo edges of the plate; c. grinding or polishing the slice to form a substrate with two major surfaces, and a coupling-out reflecting element, wherein the major surfaces are parallel to each other and not parallel to the coupling-out reflecting element, and d. cutting the substrate to the final dimensions.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for the purpose of illustrative discussion of the preferred embodiments of the present invention only and are presented to provide what is believed to be the most useful and readily understood description of the principles and conceptual aspects of the invention. In this regard, no attempt is made to show structural details of the invention in more detail than is necessary for a fundamental understanding of the invention. The description taken with the drawings is to serve as direction to those skilled in the art as to how the several forms of the invention may be embodied in practice.

In the drawings:

FIG. 1 is a side view of a prior art exemplary light-transmitting substrate;

FIG. 2 is a side view of another prior art exemplary light-transmitting substrate;

FIGS. 3A and 3B illustrate desired reflectance and transmittance characteristics of selectively reflecting surfaces, used in a prior art exemplary light-transmitting substrate, for two ranges of incident angles;

FIG. 4 illustrates a reflectance curve as a function of the incident angle for an exemplary dielectric coating;

FIGS. 5A, 5B and 5C illustrate sectional views of a prior-art transparent substrate having coupling-in and coupling-out surfaces, and a partially reflecting redirecting element;

FIGS. 6a-6e are diagrams illustrating a prior art method for manufacturing a transparent substrate;

FIGS. 7a-7e are diagrams illustrating a prior art method for manufacturing a redirecting element;

FIGS. 8a-8e are diagrams illustrating another method for manufacturing a redirecting element;

FIGS. 9a-9g are diagrams illustrating a method for manufacturing a multiple number of transparent substrates, according to the present invention;

FIGS. 10a-10g are diagrams illustrating another method for manufacturing a multiple number of transparent substrates, according to the present invention;

FIGS. 11a-11g are diagrams illustrating a method for manufacturing a multiple number of redirection elements, according to the present invention;

Figure 13A:
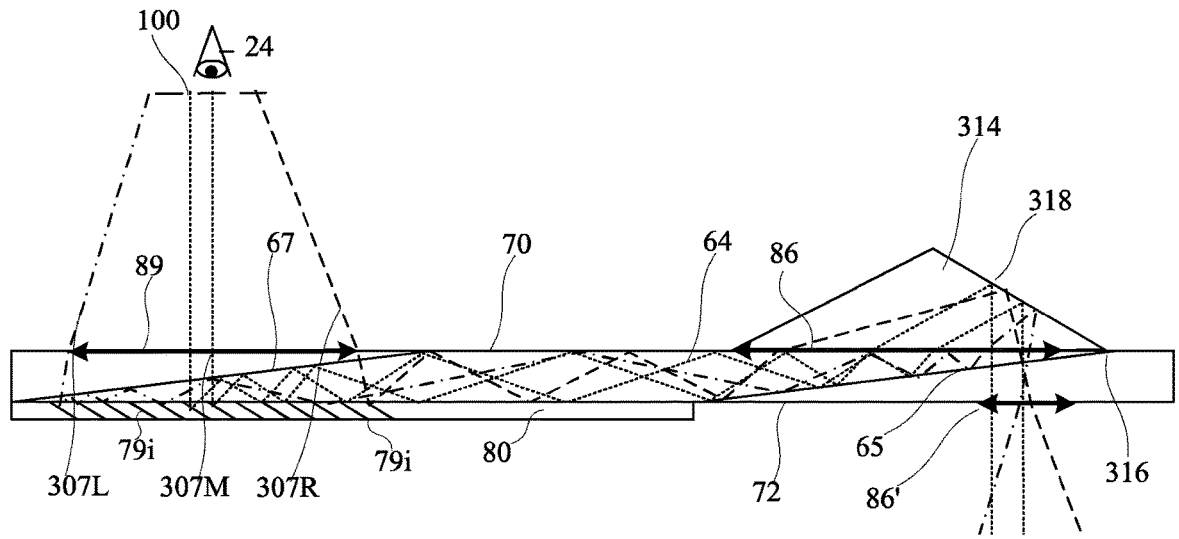
Figure 13B:
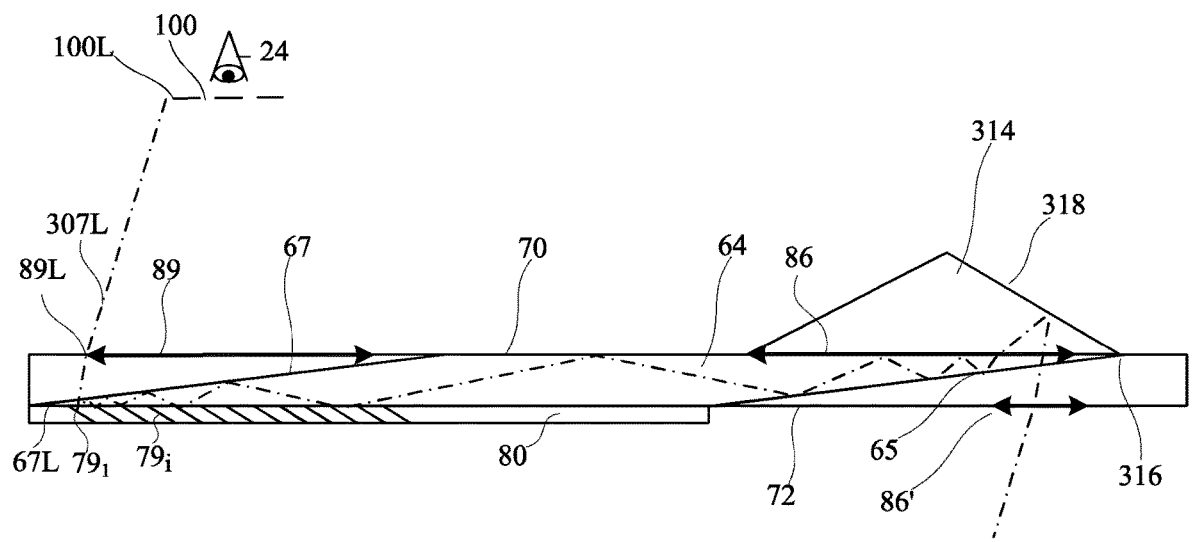
Figure 13C:
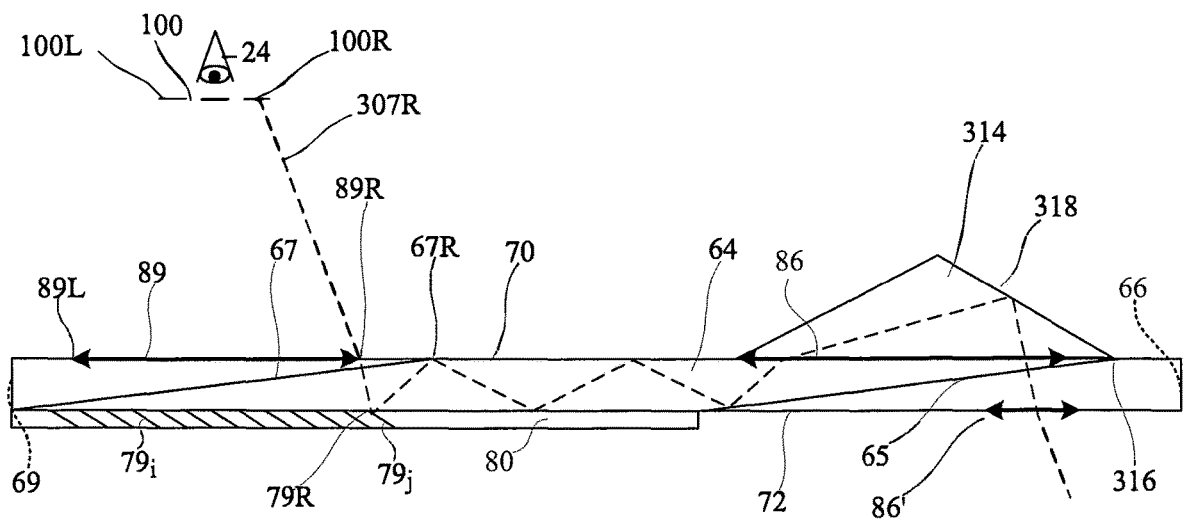
Figure 14:
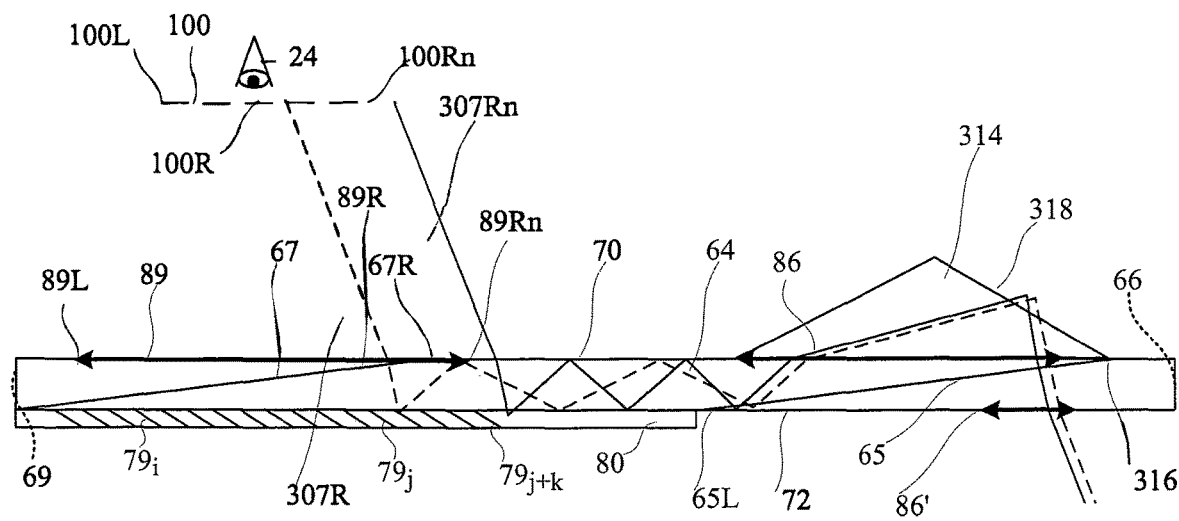
Figure 15:
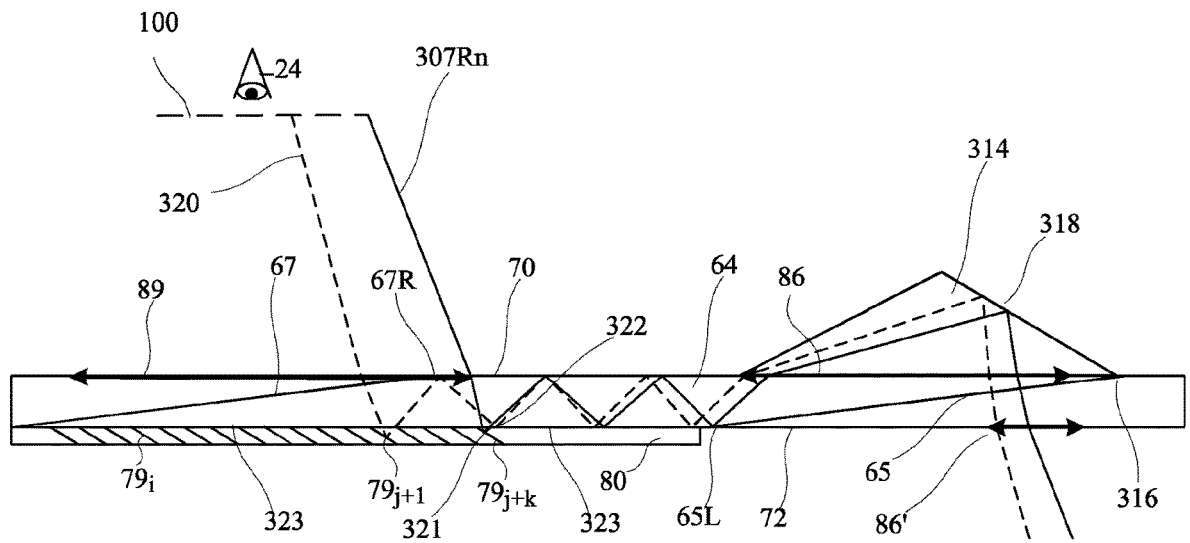
Figure 16A:
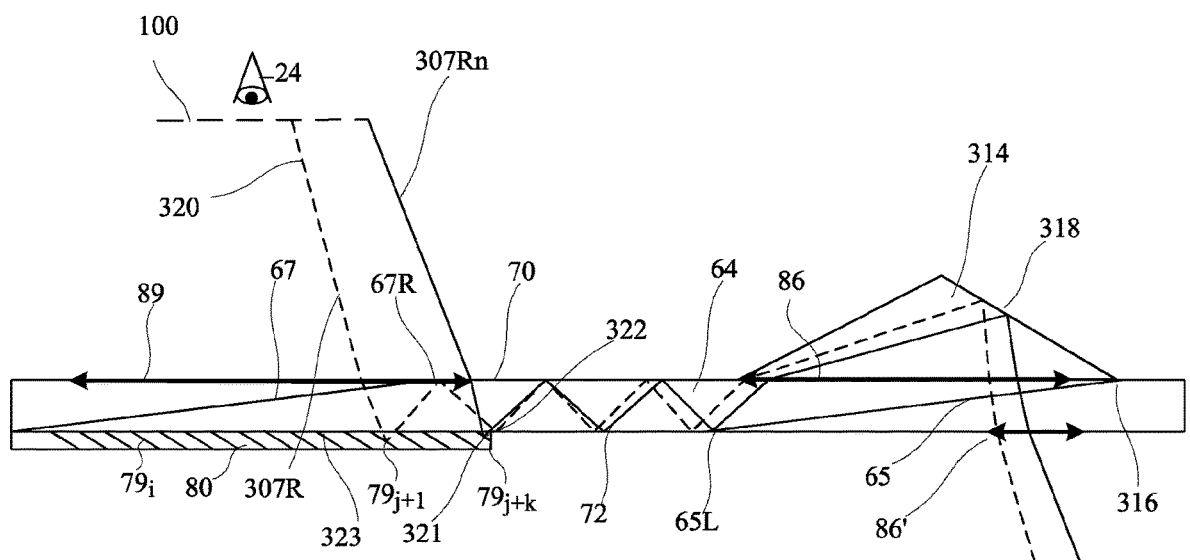
Figure 16B:
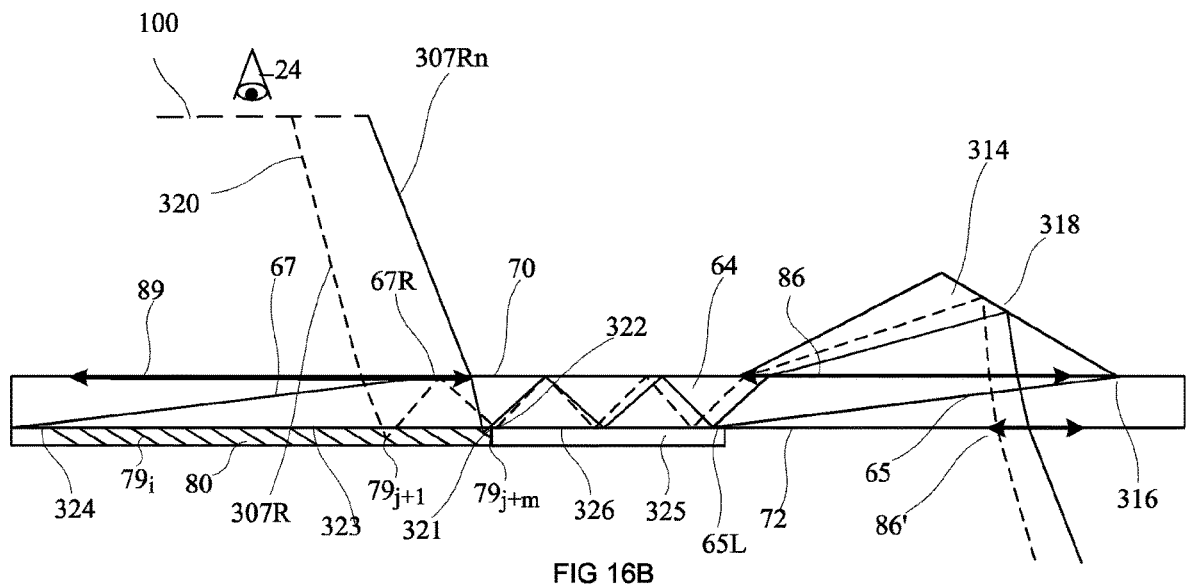
Figure 17:
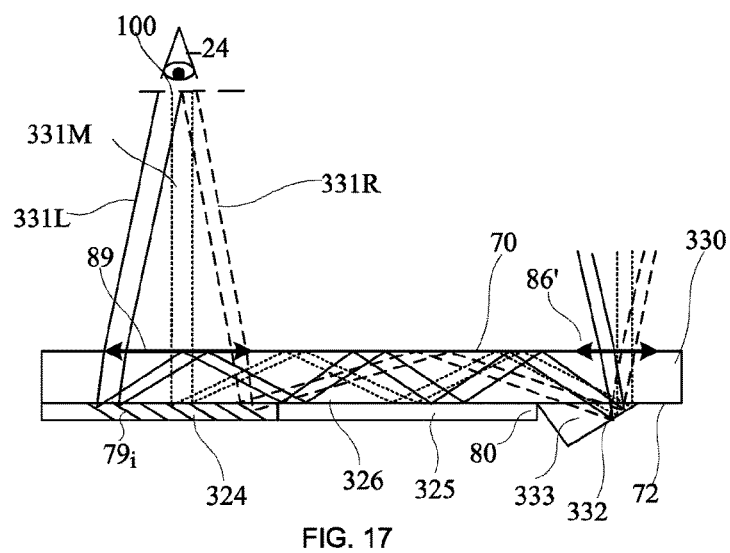

FIGS. 12a-12d illustrate a method for manufacturing a multiple number of redirection elements, according to the present invention;

FIGS. 12e-12h are diagrams illustrating another method for manufacturing a multiple number of redirection elements, according to the present invention;

FIGS. 13A, 13B and 13C are schematic sectional views of a prior art substrate-guided embodiments having a single coupling-out element, an intermediate prism, a redirecting element, and an input aperture substantially smaller than the output aperture;

FIG. 14 is a schematic sectional view of substrate-guided embodiments having a single coupling-out element, an intermediate prism, and an extended redirecting element, according to the present invention;

FIG. 15 is another schematic sectional view of a substrate-guided embodiment having a single coupling-out element, an intermediate prism, and an extended redirecting element, according to the present invention;

FIGS. 16A and 16B are yet other schematic sectional views of substrate-guided embodiments having a single coupling-out element, an intermediate prism, and an extended redirecting element, according to the present invention, and FIG. 17 is a schematic sectional view of substrate-guided embodiments having a blank transparent plate, a coupling prism, and an extended redirecting element, according to the present invention.

DETAILED DESCRIPTION OF EMBODIMENTS

Figure 1:
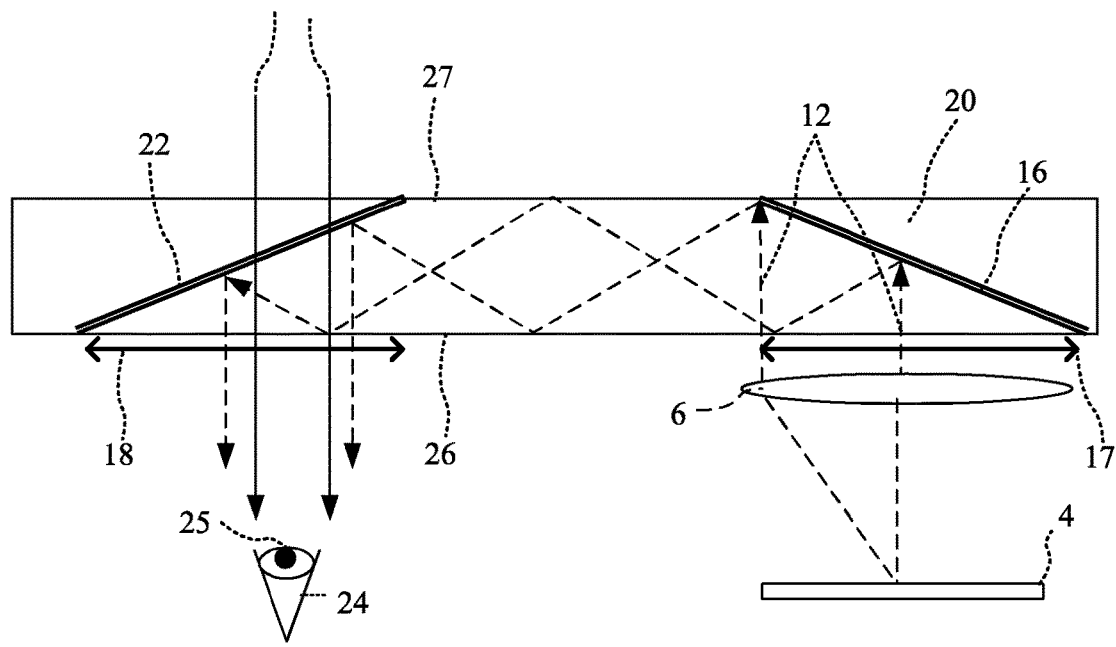

FIG. 1 illustrates a sectional view of a prior art light-transmitting substrate, wherein a first reflecting surface 16 is illuminated by a collimated light wave 12 emanating from a display source 4 and collimated by a lens 6 located between the source 4 and a substrate 20 of the device. The reflecting surface 16 reflects the incident light from the source 4 such that the light wave is trapped inside the planar substrate 20, by total internal reflection. After several reflections off the major surfaces 26, 27 of substrate 20, the trapped light waves reach a partially reflective element 22, which couple the light out of the substrate into the eye 24 of a viewer, which is located inside an output pupil 25. Herein, the input aperture 17 of the substrate 20 is defined as the aperture through which the input light waves enter the substrate, and the output aperture 18 of the substrate is defined as the aperture through which the trapped light waves exit the substrate. In the case of the substrate illustrated in FIG. 1, both the input and the output apertures coincide with the lower surface 26. Other configurations are envisioned, however, in which the input and the image light waves from the displace source 4 are located on opposite sides of the substrate, or on one of the edges of the substrate. As illustrated, the active areas of the input and the output apertures, which are approximately the projections of the coupling-in 16 and the coupling-out 22 elements on the major surface 26, respectively, are similar to each other.

In HMD systems, it is required that the entire area of the EMB is illuminated by all the light waves emerging from the display source, to enable the viewer's eye looking at the entire FOV of the projected image simultaneously. As a result, the output aperture of the system should be extended accordingly. On the other hand, it is required that the optical module should be light and compact. Since the lateral extent of the collimating lens 6 is determined by the lateral dimension of the input aperture of the substrate, it is desired that the input aperture should be as small as possible. In systems such as those illustrated in FIG. 1, wherein the lateral dimensions of the input aperture are similar to that of the output aperture, there is an inherent contradiction between these two requirements. Most of the systems based on this optical architecture suffer from small EMB and small achievable FOV, as well as from a large and cumbersome imaging module.

Figure 2:
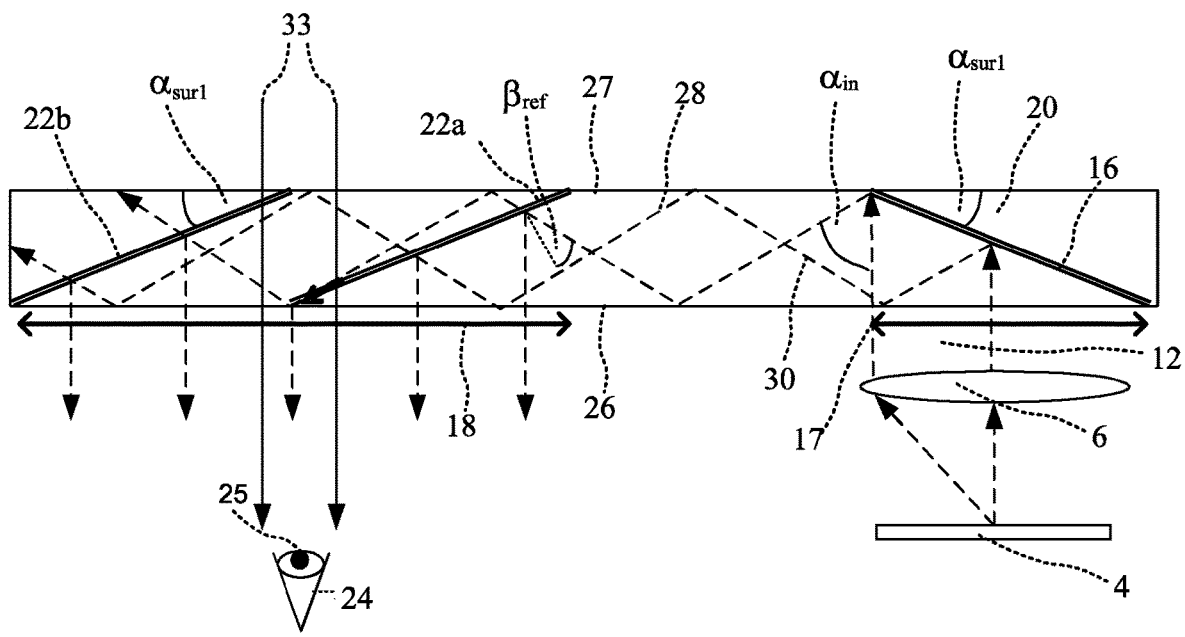

An embodiment which, at least partially solves this problem, is illustrated in FIG. 2, wherein the element which couples out the light waves from the substrate is an array of partially reflecting surfaces 22a, 22b, etc. The output aperture of this configuration can be extended by increasing the number of partially reflecting surfaces embedded inside the substrate 20. It is thus possible to design and construct an optical module having a small input aperture, as well as a large output aperture. As can be seen, the trapped rays arrive at the reflecting surfaces from two distinct directions 28, 30. In this particular embodiment, the trapped rays arrive at the partially reflecting surface 22a from one of these directions 28 after an even number of reflections from the substrate major surfaces 26 and 27, wherein the incident angle between the trapped ray and the normal to the reflecting surface is $\beta_{ref}$.

The trapped rays arrive at the partially reflecting surface 22b from the second direction 30 after an odd number of reflections from the substrate surfaces 26 and 27, wherein the incident angle between the trapped ray and the normal to the reflecting surface is $\beta'_{ref}$.

As further illustrated in FIG. 2, for each reflecting surface, each ray first arrives at the surface from the direction 30, wherein some of the rays again impinge on the surface from direction 28. In order to prevent undesired reflections and ghost images, it is important that the reflectance be negligible for the rays that impinge on the surface having the second direction 28.

A solution for this requirement that exploits the angular sensitivity of thin film coatings, was previously proposed in the Publications referred to hereinabove. The desired discrimination between the two incident directions can be achieved if one angle is significantly smaller than the other one. It is possible to provide a coating with very low reflectance at high incident angles, and a high reflectance for low incident angles. This property can be exploited to prevent undesired reflections and ghost images by eliminating the reflectance in one of the two directions.

Figure 3A:
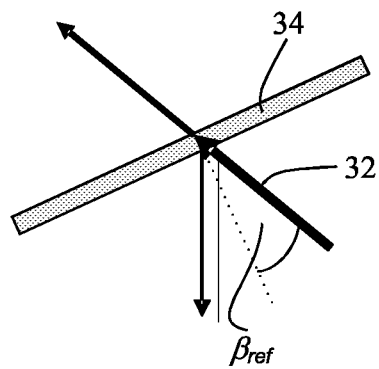
Figure 3B:
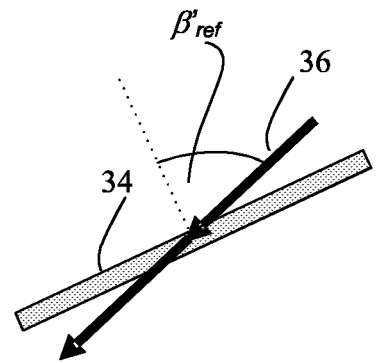

Referring now specifically to FIGS. 3A and 3B, these figures illustrate desired reflectance behavior of partially reflecting surfaces 34. While the ray 32 (FIG. 3A), having an off-axis angle of $\beta_{ref}$, is partially reflected and coupled out of the substrate 20, the ray 36 (FIG. 3B), which arrives at an off-axis angle of $\beta'_{ref}$ to the reflecting surfaces 34, is transmitted through the reflecting surfaces 34, without any notable reflection.

Figure 4:
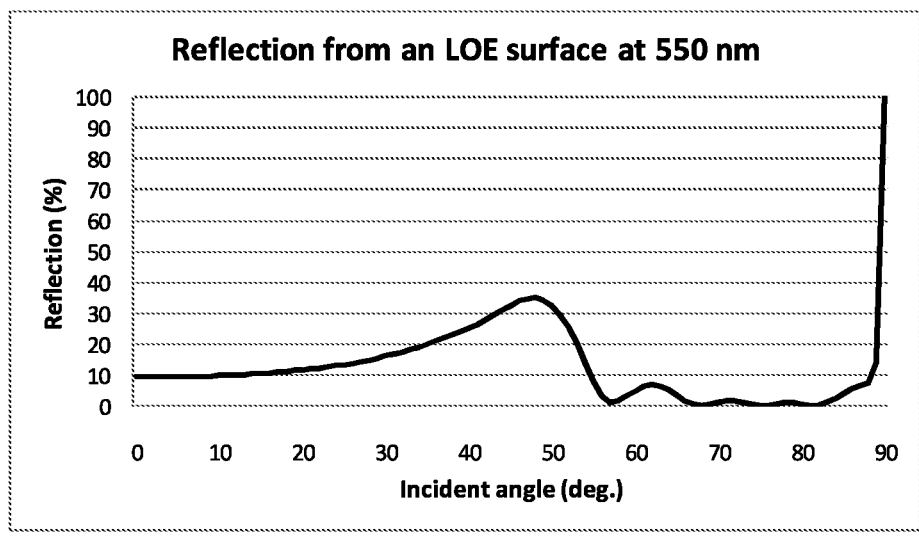

FIG. 4 illustrates the reflectance curve of a typical partially reflecting surface of this specific system as a function of the incident angle for S-polarized light with the wavelength $\lambda=550$ nm. For a full-color display, similar reflectance curves should be achieved for all the other wavelengths in the relevant visible spectrum, which is usually, for most display sources, between 430 nm and 660 nm. There are two significant regions in this graph: between 65° and 85°, where the reflectance is very low, and between 10° and 40°, where the reflectance increases monotonically with increasing incident angles. As can be seen in FIGS. 3 and 4, the requested reflectance behavior of the partially reflective surfaces 22 of the embodiment illustrated in FIG. 2, is not conventional. Furthermore, to keep the low reflectance at the higher angular region, the reflectance at the lower angular region cannot be higher than 20%-30%. Furthermore, to achieve a uniform brightness over the entire FOV, it is required that the reflectance of partially reflecting surfaces will be increased gradually toward the edge of the substrate. Hence, the maximum achievable efficiency is comparatively low and usually cannot be more than 10%.

Figure 5A:
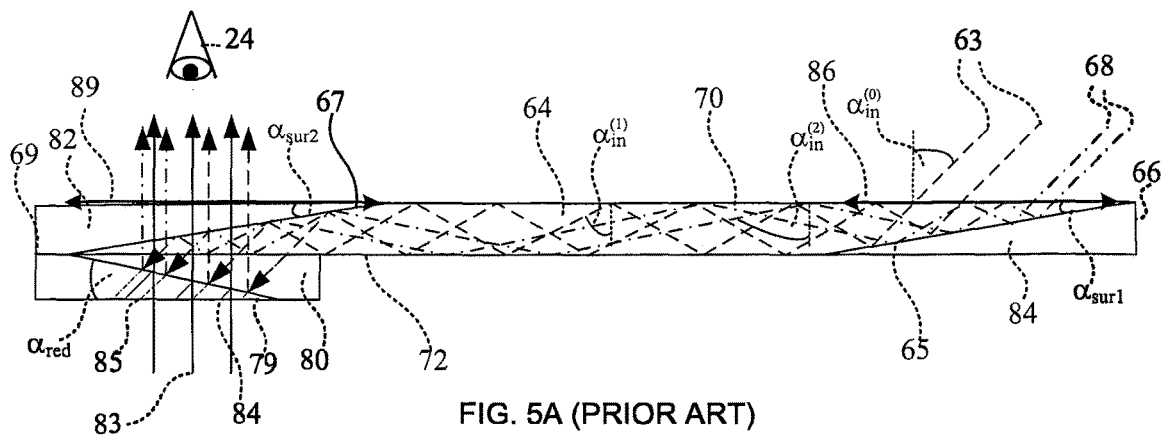
Figure 5B:
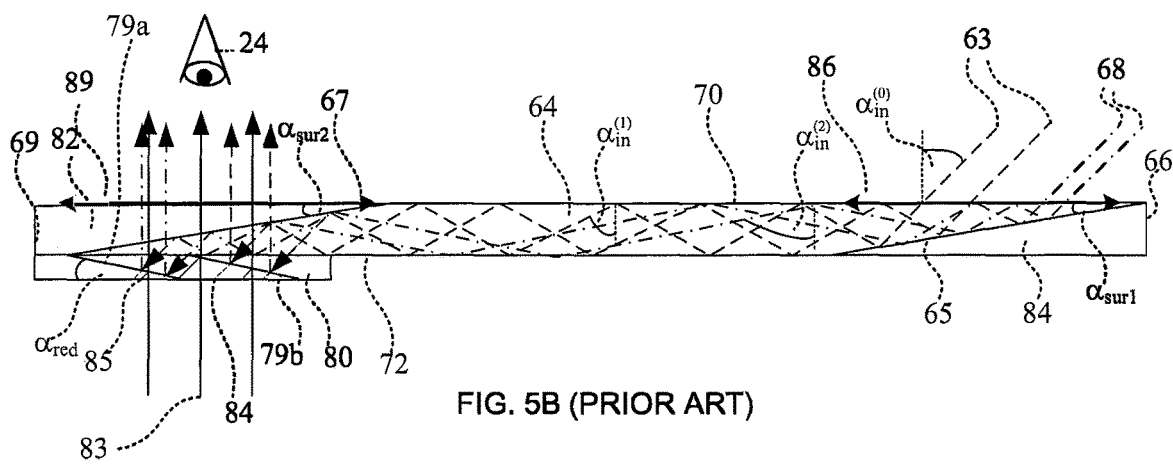

FIGS. 5A and 5B illustrate embodiments for overcoming the above-described problem. Instead of using a single element (22 in FIG. 2, or 50 in FIG. 5), which performs the dual function of coupling the light waves out of the substrate 20, as well as directing the light waves into the user's eye 24, the requested function is divided into two different elements; namely, one element, which is embedded inside the substrate couples the light waves out of the substrate, while a second conventional partially reflecting element, which is located out of the substrate, redirects the light waves into the viewer's eye. As illustrated in FIG. 5A, two rays 63 (dashed lines) from a plane light wave emanating from a display source and collimated by a lens (not shown) enter a light transparent substrate 64, having two parallel major surfaces 70 and 72, through the input aperture 86, at an incident angle of $\alpha_{in}^{(0)}$ with respect to the major surfaces 70, 72 of the substrate. The rays impinge on the reflecting surface 65, which is inclined at an angle $\alpha_{sur1}$ to the major surfaces of the substrate. The reflecting surface 65 reflects the incident light rays such that the light rays are trapped inside a planar substrate 64 by total internal reflection from the major surfaces. In order to differentiate between the various "propagation orders" of the trapped light waves, a superscript (i) will denote the order i. The input light waves which impinge on the substrate in the zero-order are denoted by the superscript (0). After each reflection from the coupling-in reflecting surface the order of the trapped ray is increased by one from (i) to (i+1). The off-axis angle $\alpha_{in}^{(1)}$ between the trapped ray of the first order and the normal to the major surfaces 70, 72 is $$\alpha_{in}^{(1)} = \alpha_{in}^{(0)} + 2 \cdot \alpha_{sur1}. \quad (1)$$

After several reflections off the surfaces of the substrate, the trapped light rays reach a second flat reflecting surface 67, which couples the light rays out of the substrate. Assuming that surface 67 is inclined at the same angle to the major surfaces as the first surface 65, that is to say, surfaces 65 and 67 are parallel and $\alpha_{sur2} = \alpha_{sur1}$, then the angle $\alpha_{out}$ between the coupled-out rays and the normal to the substrate plane is $$\alpha_{out} = \alpha_{in}^{(1)} - 2 \cdot \alpha_{sur2} = \alpha_{in}^{(1)} - 2 \cdot \alpha_{sur1} = \alpha_{in}^{(0)}. \quad (2)$$

Hence, the coupled-out light rays are inclined to the substrate at the same angle as the incident light rays. So far, the coupled-in light waves behave similarly to the light waves illustrated in FIG. 1. FIG. 5A, however, illustrates a different behavior wherein two light rays 68 (dashed-dotted lines), having the same incident angle of $\alpha_{in}^{(0)}$ as rays 63, impinge on the right side of the reflecting surface 65. After two reflections from surface 65, the light waves are coupled inside the substrate 64 by a total internal reflection, and the off-axis angle of the trapped rays inside the substrate is now $$\alpha_{in}^{(2)} = \alpha_{in}^{(1)} + 2 \cdot \alpha_{sur1} = \alpha_{in}^{(0)} + 4 \cdot \alpha_{sur1}. \quad (3)$$

After several reflections off the major surfaces of the substrate, the trapped light rays reach the second reflecting surface 67. The light rays 68 are reflected twice from the coupling-out surface 67. The light rays are then coupled out from the substrate at the same off-axis angle $\alpha_{out}$ as the other two rays 63, which are reflected only once from surfaces 65 and 67, which is also the same incident input angle of these four rays on the substrate major planes. Although all the four rays impinge and are coupled out of the substrate at the same off-axis angle, there is a substantial difference between them: the two light rays 68, which incident on the right side of the reflecting surface 65, are closer to the right edge 66 of substrate 64, are reflected twice from surfaces 65 and 67, and are coupled out from the substrate at the left side of surface 67, which is closer to the opposite left edge 69 of the substrate. On the other hand, the two light rays 63, which incident on the left side of the reflecting surface 65, are closer to the center of substrate 64, and are reflected once from surfaces 65 and 67, and are coupled out from the substrate at the right side of surface 67, which is closer to the center of the substrate.

As further illustrated in FIGS. 5A and 5B, the inclination angle $\alpha_{out}$ of the image can be adjusted by adding a partially reflecting surface 79, which is inclined at an angle of $\alpha_{red}$ to the surface 72 of the substrate. As shown, the image is reflected and rotated such that it passes again through the substrate substantially normal to the major surfaces of the substrate and reaches the viewer's eye 24 through the output aperture 89 of the substrate. To minimize distortion and chromatic aberrations, it is preferred to embed surface 79 in a redirecting prism 80 and to complete the shape of the substrate 64 with a second prism 82, both of which are fabricated of the same material which, should not necessarily be similar to that of prism 80. In order to minimize the thickness of the system, it is possible, as illustrated in FIG. 5B, to replace the single reflecting surface 79 with an array of parallel partially reflecting surfaces 79a, 79b, etc., where the number of the partially reflecting surfaces can be determined according to the requirements of the system. Another way to redirect the coupled-out light waves into the viewer's eye is to use a flat meta-surface structured with subwavelength-scaled patterns.

FIGS. 6a-6e illustrate a prior art method for manufacturing the main transparent substrates 64. As shown in a side view of the x-z plane, a plurality of transparent flat plates 141 coated with the appropriate optical coatings 142 (step (a)) (if required) are cemented together using the appropriate optical adhesives so as to create a stacked form 143 (step (b)). A number of segments 144 (step (c)) are then sliced off the stacked form by cutting, grinding and polishing, to create the desired substrates 146 (step (d)). As shown in a top view of the x-y plane, several elements 148 can be cut-off from each slice 146 (step (e)). FIGS. 6a-6e illustrate a method for fabricating substrates having only two reflecting surfaces 65 and 67. For other embodiments, such as the redirecting element 80, where a larger number of reflecting surfaces are embedded inside the substrates, a larger number of flat plates should be added to the fabrication process accordingly.

As illustrated in FIGS. 7a-7e, which show a side view of the x-z plane, a plurality of identical partially reflecting flat plates 150 coated with the appropriate beamsplitting coating step (a) are cemented together between two transparent plates 152, 154 using the appropriate optical adhesives so as to create a stacked form 156 (step (b)). Usually, the number of the plates 150 is the same number of the partially reflecting surfaces in the redirecting element 80. A number of segments 158 (step (c)) are then sliced off the stacked form. The redirecting elements' final dimensions are set by cutting step (d), grinding and polishing, to create the desired substrates 162 (step (e)). FIG. 7 illustrates a fabrication method for a redirecting element having four partially reflecting elements 79. For systems with a large output aperture and a thin redirecting element 80, however, it is required to embed a much larger number of partially reflecting surfaces 79 in element 80.

FIGS. 8a-8f illustrate an alternative method for manufacturing the redirecting element 80. As shown in a side view of the x-z plane, a plurality of identical partially reflecting flat plates 164 coated with the appropriate beamsplitting coating step (a) are cemented together using the appropriate optical adhesives so as to create a stacked form 166 (step (b)). A plurality of identical stacks 166i (i=a, b, c . . . ) are cemented together in a staggered arrangement between two transparent plates 167, 168 using the appropriate optical adhesives so as to create a stacked form 170 (step (c)). Usually, the number of plates 164 in the stack 170 is the same number of the partially reflecting surfaces in the redirecting element 80. A number of segments 171 (step (d)) are then sliced off the stacked form. The redirecting elements' final dimensions are set by cutting step (d), grinding and polishing, to create the desired substrates 172 (step (e)).

In all the embodiments illustrated in FIGS. 6a-6e to FIGS. 8a-8f, the number of plates that can be stacked is restricted by the number of reflecting surfaces in the final element. In FIGS. 6a-6e, the number of the stacked plates is n+1, while in FIGS. 7a-7e to FIGS. 8a-8f it is n+2, where n is the number of the reflecting surfaces in the final element. This restriction in the number of the stacked plates limits the number of elements produced from a single stack. Usually, a conventional slicing device, typically a wire saw machine, can accommodate a much larger stack than the achievable size due to this limitation. As a result, the total yield of the manufacturing methods illustrated in FIGS. 6a-6e to FIGS. 8a-8f, is substantially restricted.

To improve the yield of the manufacturing method, it is required to arrange the plates' stack in a periodic unlimited structure. That is to say, the structure should not be limited by the number of reflecting surfaces in the substrate but instead determined by the slicing device's overall capacity. The structure of the stack_should typically, also be periodic to enable a uniform arrangement of the slicing device's wires.

FIGS. 9a-9g illustrate an improved method for manufacturing the main transparent substrates 64. As shown in a side view of the x-z plane, a plurality of transparent flat plates 174, having at least two edges 101 and two major parallel surfaces 102, and coated with the appropriate optical coatings step (a) (if required) are cemented together using the appropriate optical adhesives so as to form a stacked form 175 having two main flat sides 105R, 105L (step (b)). The stack 175 can contain any number of plates 174 according to the capacity of the slicing device. Optionally, two prisms 176a and 176b can be cemented to the lower and upper main surfaces 104 of stack 175 to simplify the stack's positioning inside the slicing device. Several segments 178 (hatched lines step (c)) are then sliced off the stacked form. A single slice 179 (dotted lines) containing the internal structure of the substrate 64 (FIGS. 5A-5C) can be cut from each plate 174 (step (d)). The substrates' final dimensions are set by cutting off at 180 (step (e)), grinding and polishing, to form the desired lateral dimensions of the substrate 182 (step (f)). As shown in a top view of the x-y plane, several elements 183 can be cut-off from each slice 179 (step (g)). The dashed lines denote the cutting outlines, while the dotted-dashed lines denote the intersections of the slanted coupling-in surface 65 and coupling-out surface 67 with the major surfaces 70 and 72 of the substrate 64. In the specific example illustrated here, eight plates were cemented together to form stack 175. Consequently, the number of the plates forming the stack is substantially larger than the number of the reflection coupling-out surface 67, which is only one. Clearly, a much larger number of plates can be stacked together in stack 175. To simplify the positioning of the stack inside the slicing device, the external surfaces 177a, 177b of prisms 176a, 176b (FIG. 9b), which are placed next to the surfaces of the device, should be slanted at an angle $\alpha_{sur1}$ in relation to the major surfaces of the plates 174.

There are some significant differences between the prior-art stacking methods illustrated in FIGS. 6 and 7 and the proposed method illustrated in FIG. 9:

1. In the prior-art methods illustrated in FIGS. 6 and 7, the plates were arranged at a staggering structure to increase the yield of the process. In the proposed method of FIG. 9, the edges 101 of the plates 174 are aligned together to form at least two main flat sides 105R, 105L, in addition to the two main surfaces 104U, 104L.
2. In the proposed method shown in FIG. 9, the stack is oriented such that the slicing lines 107 pass through the stack between its two main sides 105R, 105L. In the prior art methods, the slicing lines pass either diagonally from the upper left edge to the lower right edge of the stack (FIG. 6), or through its main surfaces (FIG. 7).
3. In the proposed method shown in FIG. 9, stack 175 is oriented such that the slicing lines 107 pass through at least two edges 101 for all the stacked plates 174. There may be configurations where the slicing lines 107 will pass through only one edge, usually in the two outermost plates. For the majority of the plates, however, two opposite edges are crossed by the slicing lines. In the prior art method illustrated in FIG. 6, the slicing lines cross only the left edge of the upper plate and the right edge of the lower plate, but do not pass through the edges of the middle plate. In the prior art method illustrated in FIG. 7 the slicing lines pass only through the main surfaces of the stack and do not pass at all through the plates' edges.
4. To maintain the periodic structure of stack 175, the distance between two adjacent slicing lines 107 is constant and proportional to the thickness of plate 174. In the prior art methods, there is no such a connection between these two parameters.
5. As illustrated in FIG. 9, the slicing lines 107 cross the plate edges 101 are substantially at the same locations 108 for all the stacked plates 174.

Figures 9A, 9B, 9C:
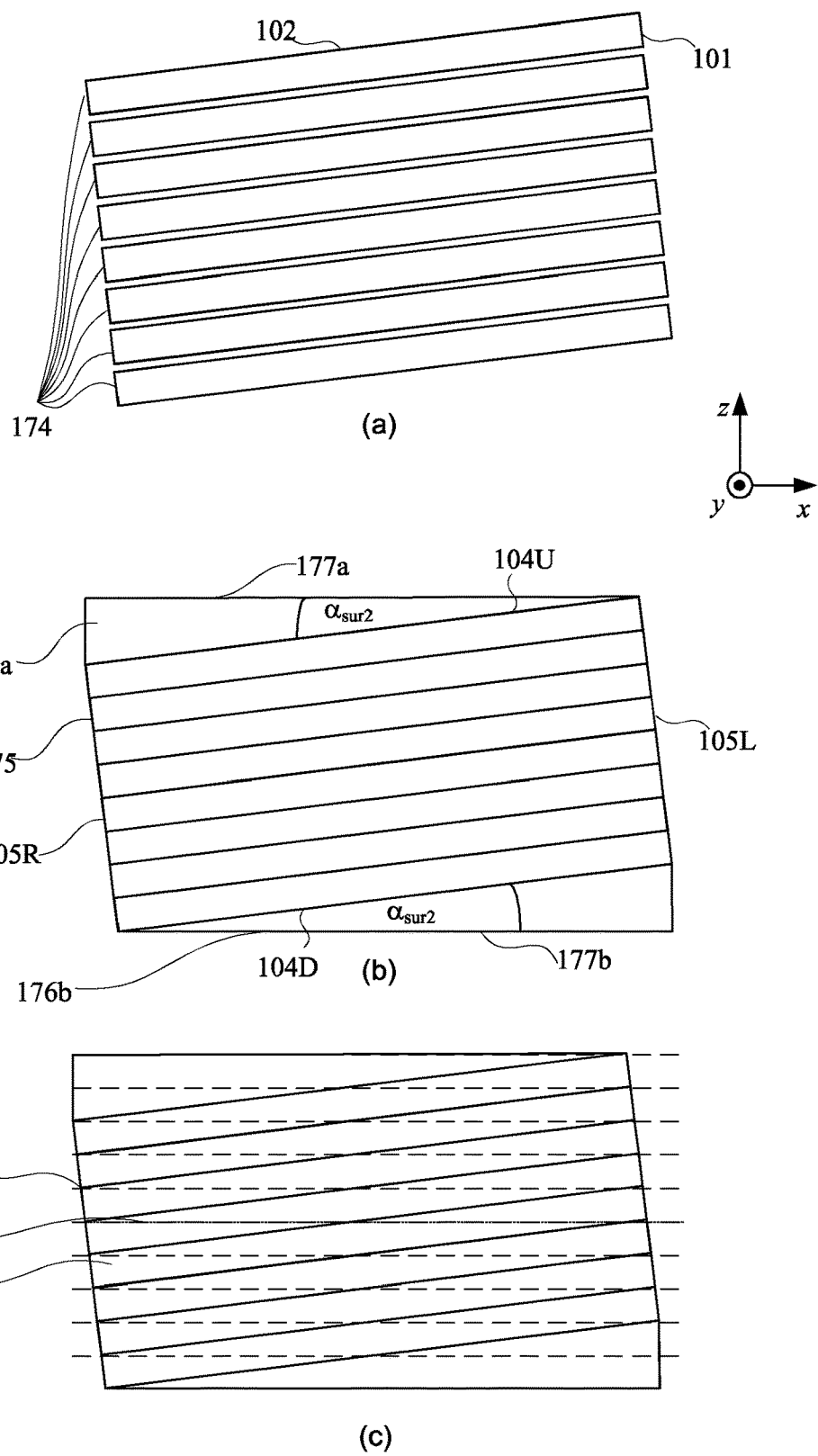
Figures 9D, 9E, 9F, 9G:
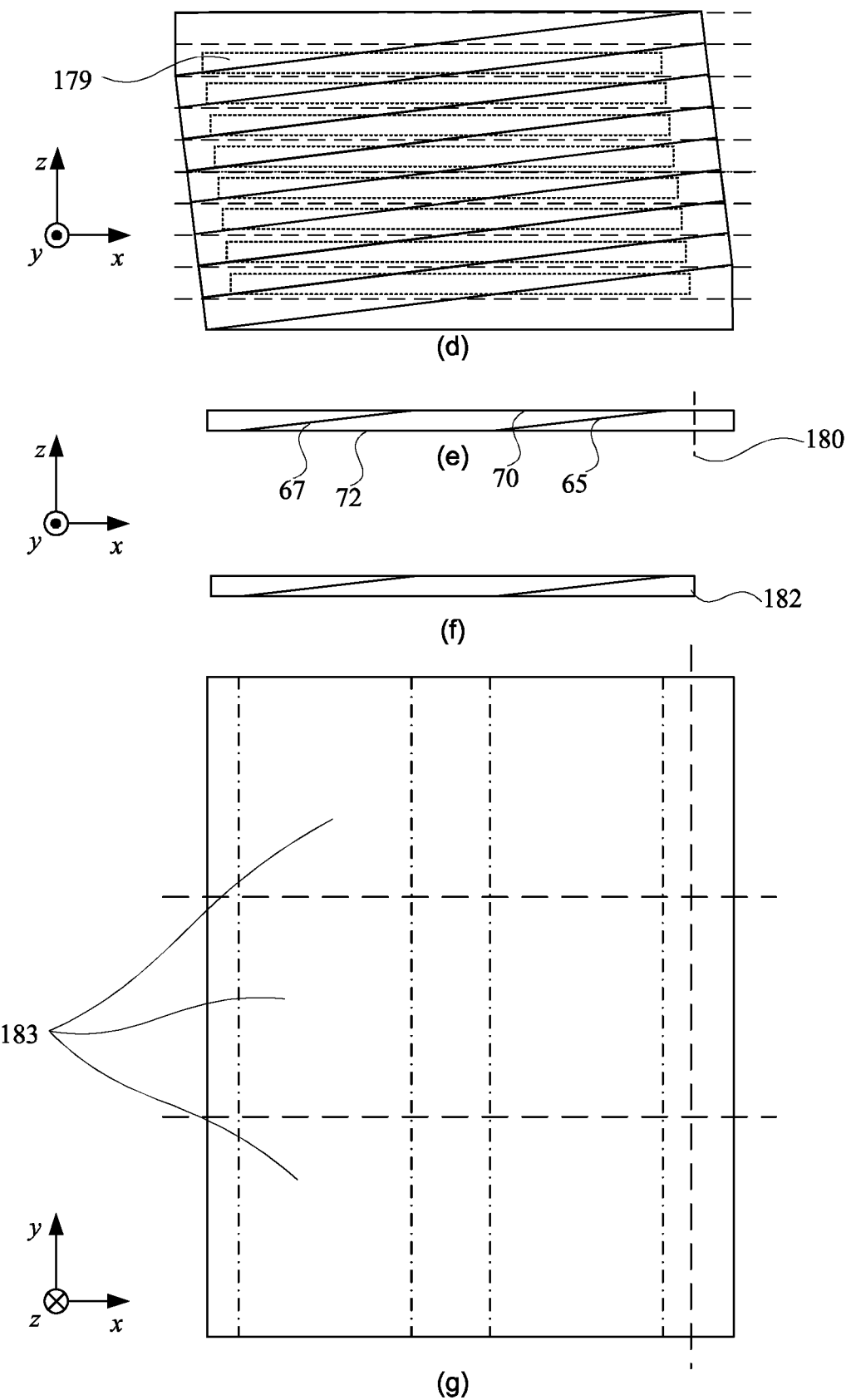
Figure 10A:
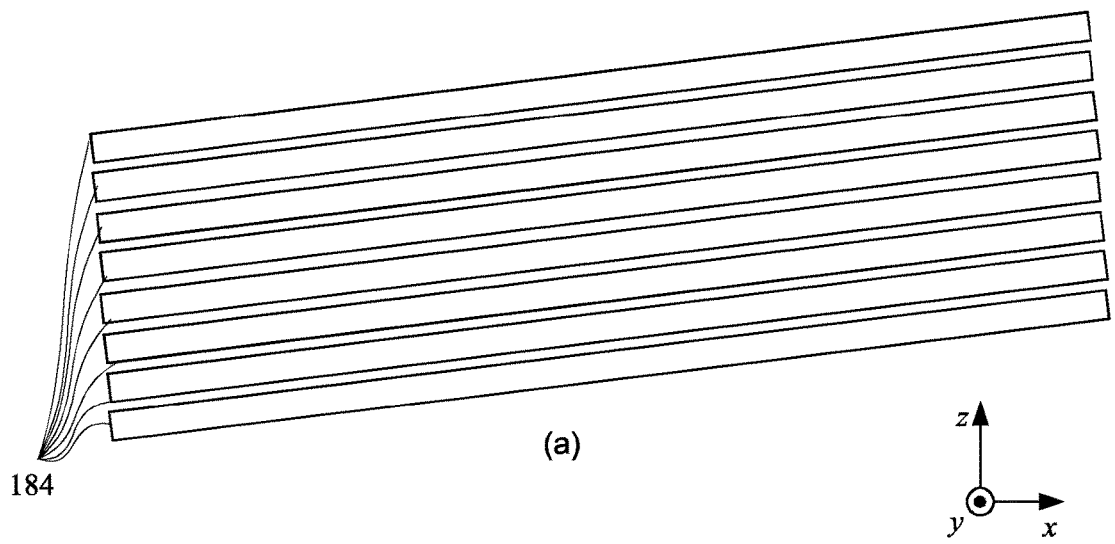
Figure 10B:
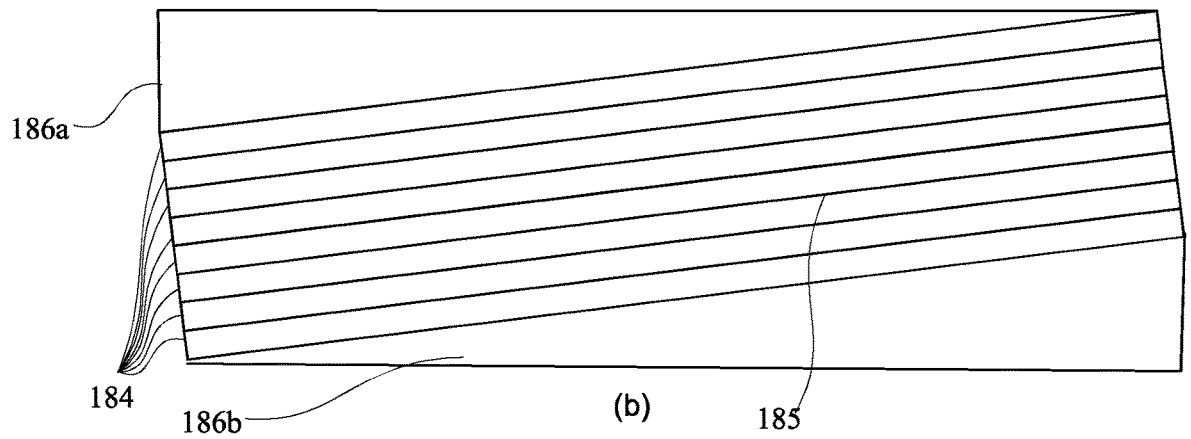
Figure 10C:
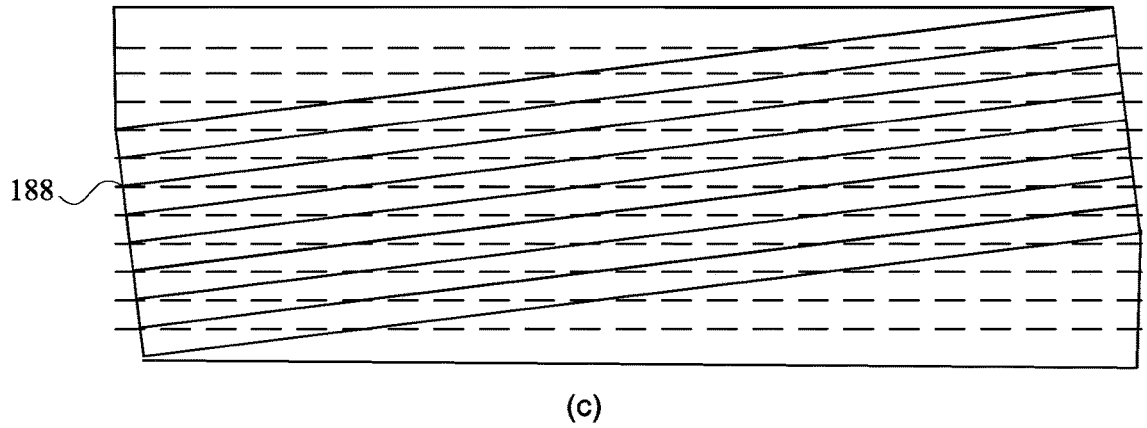
Figures 10D, 10E, 10F, 10G:
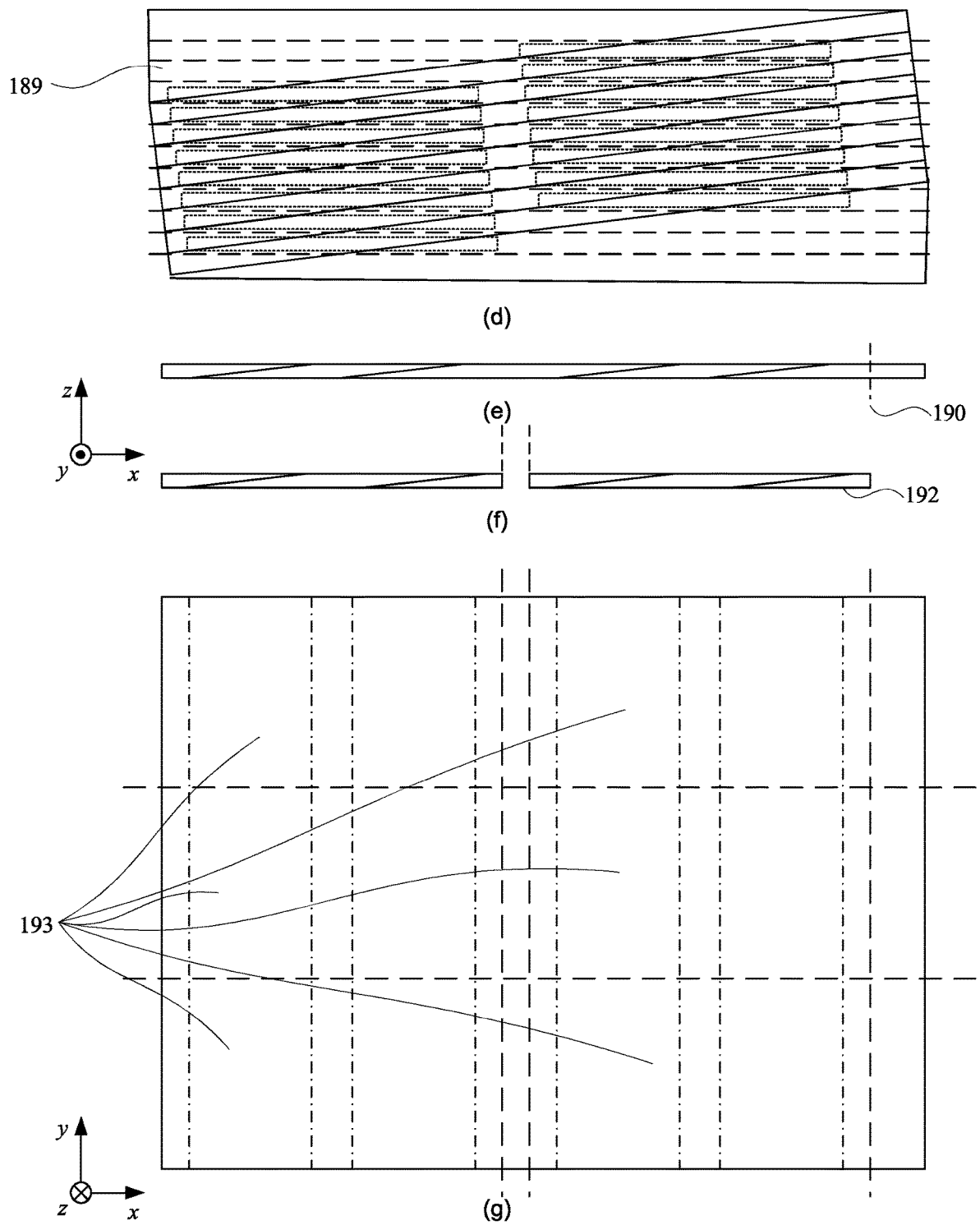
Figures 11A, 11B, 11C, 11D:
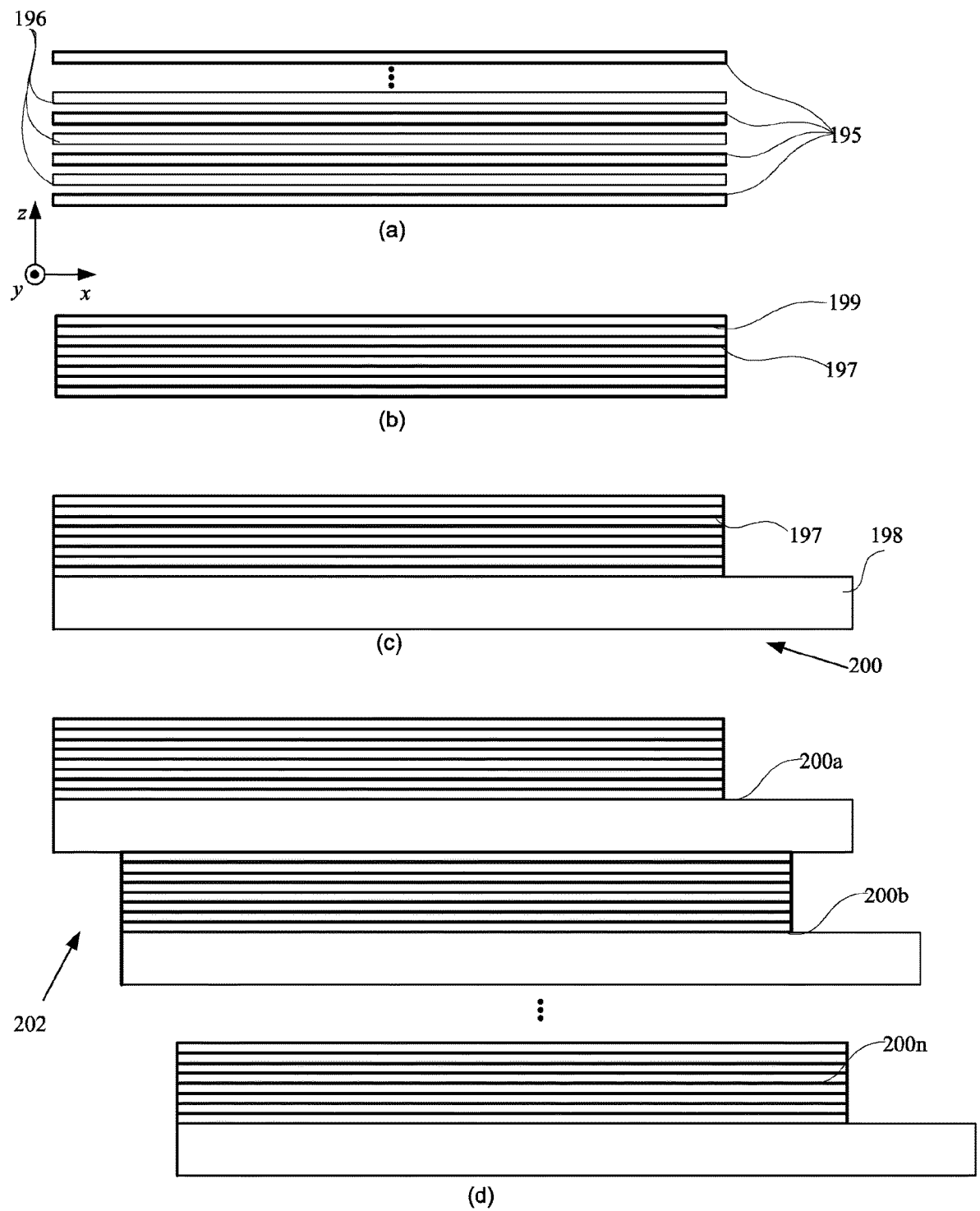
Figures 11E, 11F, 11G:
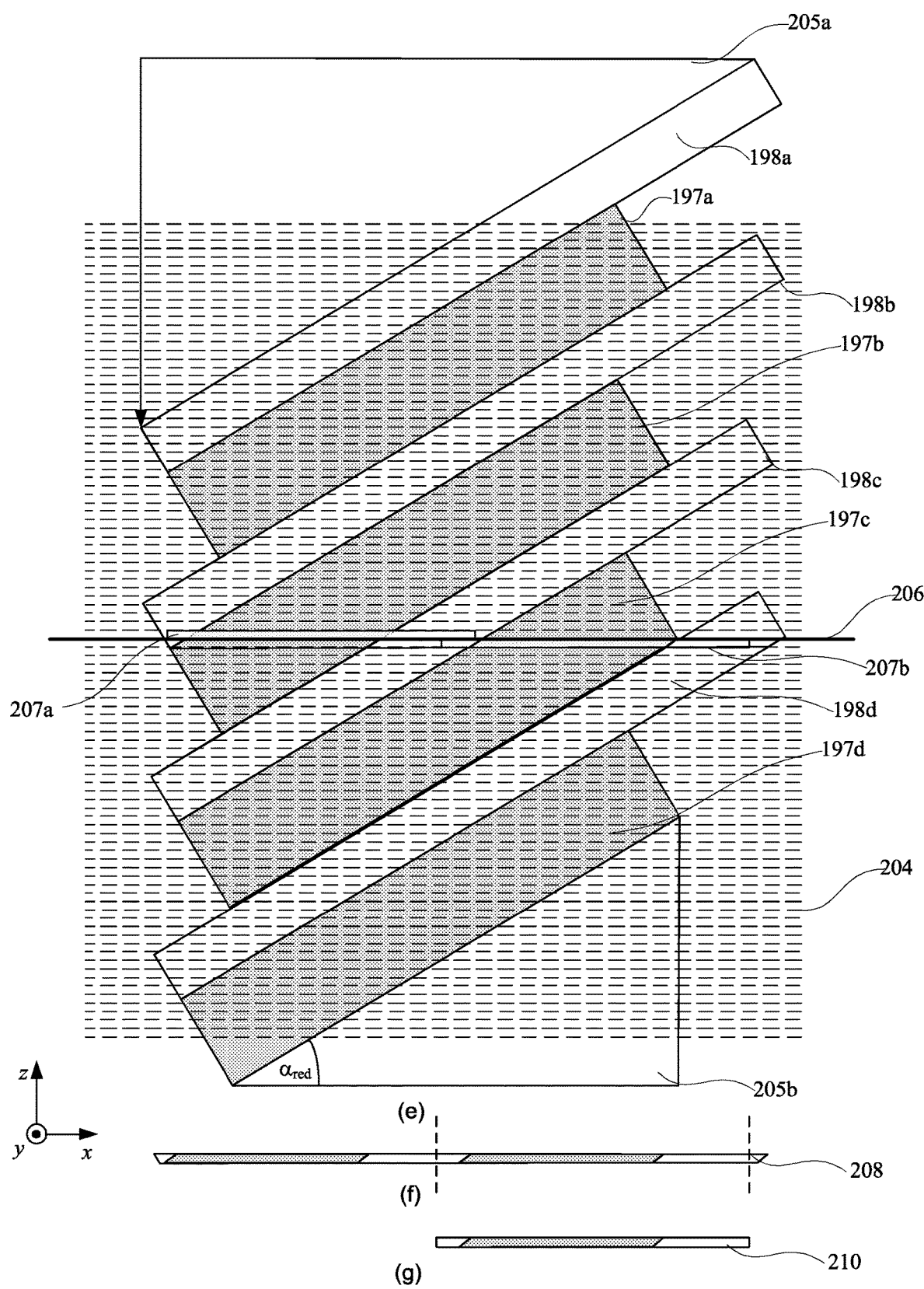
Figures 12A, 12B, 12C, 12D:
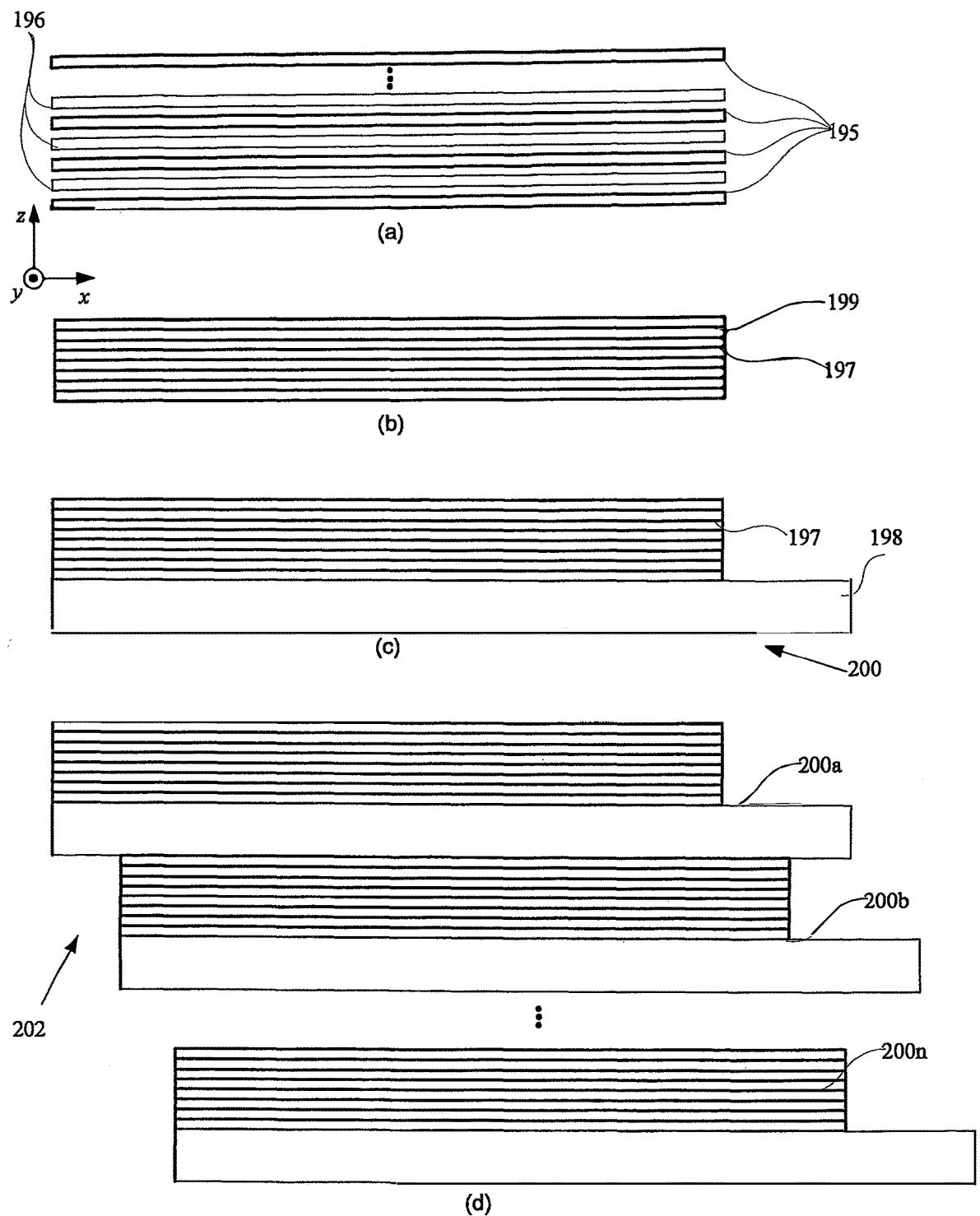
Figure 12E:
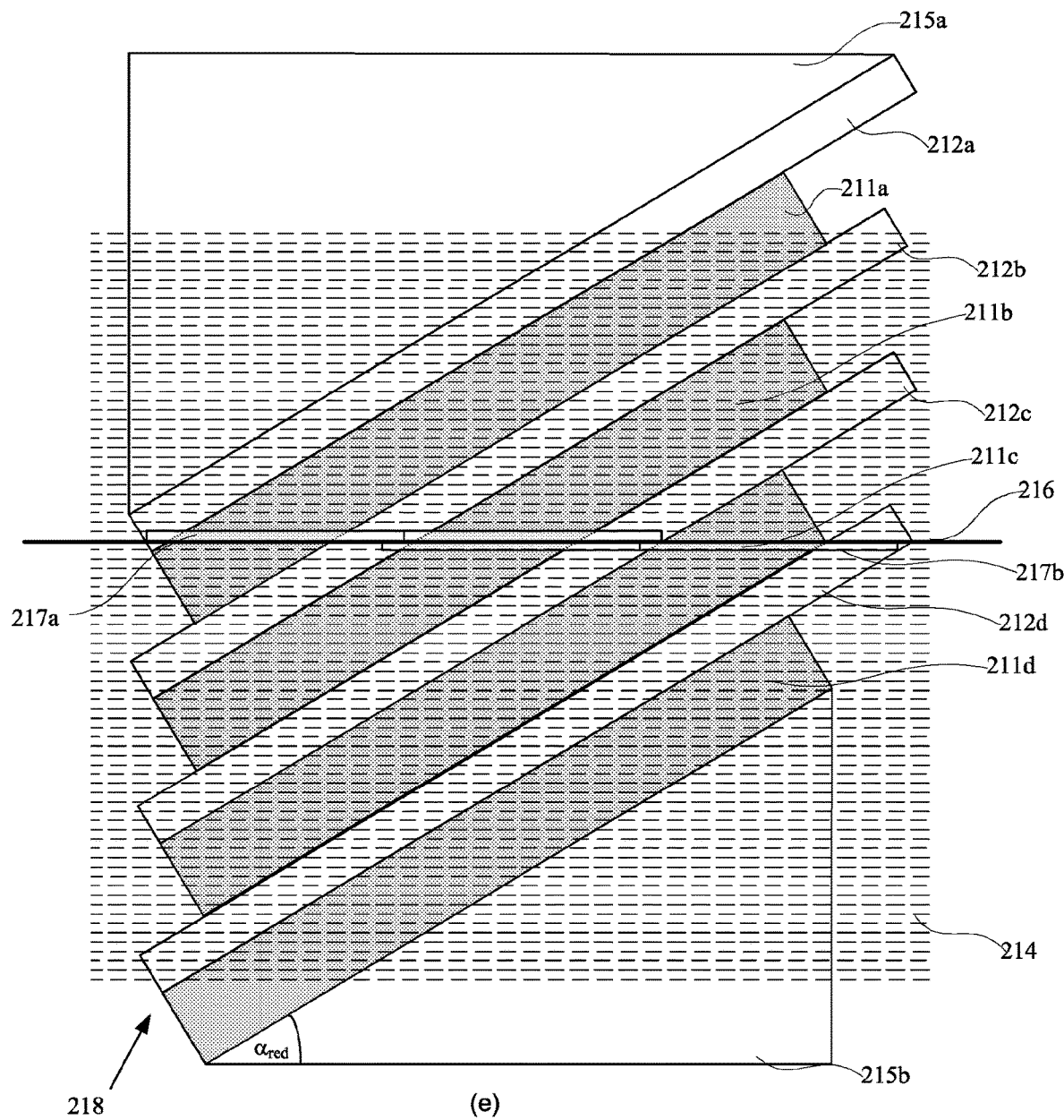
Figures 12F, 12G, 12H:
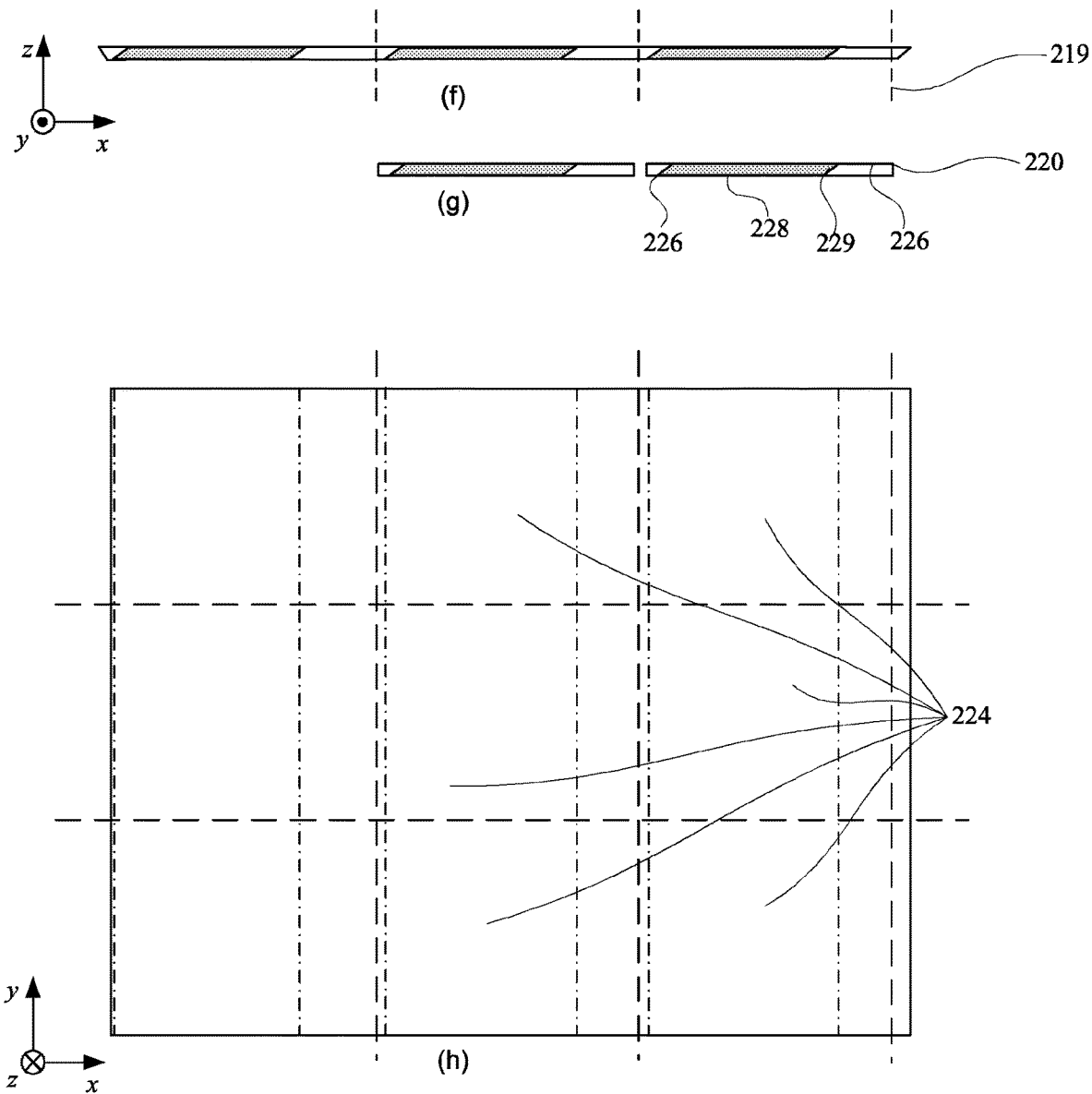

In the manufacturing method illustrated in FIGS. 9a-9g the stack 175 can fully occupy the slicing device along the z and y dimension. It is possible, however, to further increase the yield of the manufacturing method by enlarging the stack along the x-axis. FIGS. 10a-10g illustrate another method for manufacturing the main transparent substrates 64. As shown in a side view of the x-z plane, a plurality of transparent flat plates 184 coated with the appropriate optical coatings step (a) (if required) are cemented together using the appropriate optical adhesives so as to achieve a stacked form 185 step (b). The dimension of each plate 184 along the x-axis is much longer than that of plate 174 (FIG. 9a). The stack 185 can contain any number of plates 184 according to the capacity of the slicing device. Optionally, two prisms 186a and 186b can be cemented to the edges of stack 185 for simplifying the positioning of stack 185 inside the slicing device. A number of segments 188 step (c) are then sliced off the stacked form. A single slice 189 (FIG. 10*d*) containing the internal structure of at least two substrates 64 can be cut from each plate 184 step 10(*d*). The substrates' final dimensions are set by cutting off at 190 step (e), grinding and polishing, to form the desired substrates 192 step (f). As shown in FIG. 10(*e*), a top view of the x-y plane, several elements 193 can be cut-off from each slice 189 step (g). Unlike the method illustrated in FIGS. 9*a-g*, wherein a one-dimensional array along the y-axis of elements 183 can be cut off from each slice 179, a two-dimensional array along the x and y axes of elements 193 can be cut off each slice 189.

FIGS. 11*a*-11*g* illustrate an improved method for manufacturing the redirecting elements 80 (FIGS. 5A-5C). as shown in a side view of the x-z plane, a plurality of transparent flat plates, comprises an interlaced arrangement of 2n+1 plates, including n+1 double-sided coated plates 195 and n uncoated plates 196 (step (a)) are cemented together using the appropriate optical adhesives so as to produce an initial stacked form 197 step (b), each interface plane 199 between two adjacent plates contains a one and only one partially reflecting surface. The initial stack 197 is cemented to a blank plate 198 (FIG. 11*c*) so as to achieve an intermediate stacked form 200 (step (c)). A plurality of identical intermediate stacks 200*i* (i=a, b, c . . . ) are cemented together in a staggered arrangement so as to make an inclusive stacked form 202 (step (d)). The inclusive stack 202 can contain any number of intermediate stacks 200 according to the capacity of the slicing device. Optionally, two prisms 205*a* and 205*b* (FIG. 11*e*) can be cemented to the edges of the inclusive stack 202, in order to simplify the stack's positioning inside the slicing device. Several segments 204 (step (e)) are then sliced off the inclusive stacked form. A single slice 207*a*, 207*b* containing the internal structure of the redirecting element 80 can be cut from each segment 204. The exact part of each segment, utilized for element 80, is determined by the relative position of the slice in the inclusive stack 202. In segment 207*a*, located above the cutting line 206, element 80 (FIGS. 5*a*-5*c*) is composed of parts 198*b*, 197*b* and 198*c*, while in segment 207*b*, located below the cutting line 206, element 80 is composed of parts 198*c*, 197*c* and 198*d*. The redirecting elements' final dimensions are set by cutting 208 (step (f)), grinding and polishing, to form the desired substrates 210 (step (g)). In the specific example illustrated here, each intermediate stack 200 contains 2n+1 thin plates 195, 196 and 2n+2 partially reflecting surfaces, which is the number of the partially reflecting surfaces 79 in the redirecting element 80. Assuming that each inclusive stack 202 contains m intermediate stacks 200, then the total number of plates 195, 196 in the inclusive stack is m·(2n+1). Consequently, the number of the plates forming the inclusive stack is substantially larger than the number of the partially reflecting surfaces 79 in the redirecting element 80.

FIGS. 12*e*-12*h* illustrate a modified method for manufacturing the redirecting elements 80, wherein the dimension of each initial stack 211 and plate 212 along the x-axis is much longer than that of the initial stack 197 and the plate 198 in FIGS. 11*a*-11*g*. Here, steps a-d (not shown in this figure) are similar to steps a-d in FIGS. 11(*a*)-11(*d*). Several segments 214 (step (e)) are then sliced off the inclusive stacked form 218. A single slice 217*a*, 217*b* containing the internal structure of at least two redirecting element 80 can be cut from each segment 214. The exact part of each segment, which is utilized for element 80 is determined by the slice's relative position in the inclusive stack 218. In segment 217*a*, located above the cutting line 216, elements 80 are composed of parts 212*a*, 211*a*, 212*b*, 211*b* and 212*c*, while in segment 217*b*, located below the cutting line 216, elements 80 are composed of parts 212*b*, 211*b*, 212*c*, 211*c* and 212*d*. The redirecting elements' final dimensions are set by cutting 219 (step (f)), grinding and polishing, to create the desired substrates 220 (step (g)). As shown in a top view of the x-y plane, a two-dimensional array, along the x and they axes, of elements 222 can be cut-off from each slice 214 (step (h)). The dashed lines denote the cutting outlines, while the dotted-dashed lines denote the intersections of the marginal beamsplitting surfaces 79 (FIGS. 5A-5C) with the major surfaces of the redirecting elements 80. Each final redirecting element 222 comprises an inactive section 226 and an active section 228 containing 2n+2 partially reflecting surfaces $79_i$ (i=1 . . . 2n+2) that redirect the coupled-out light waves into the viewer's eye.

Figure 5C:
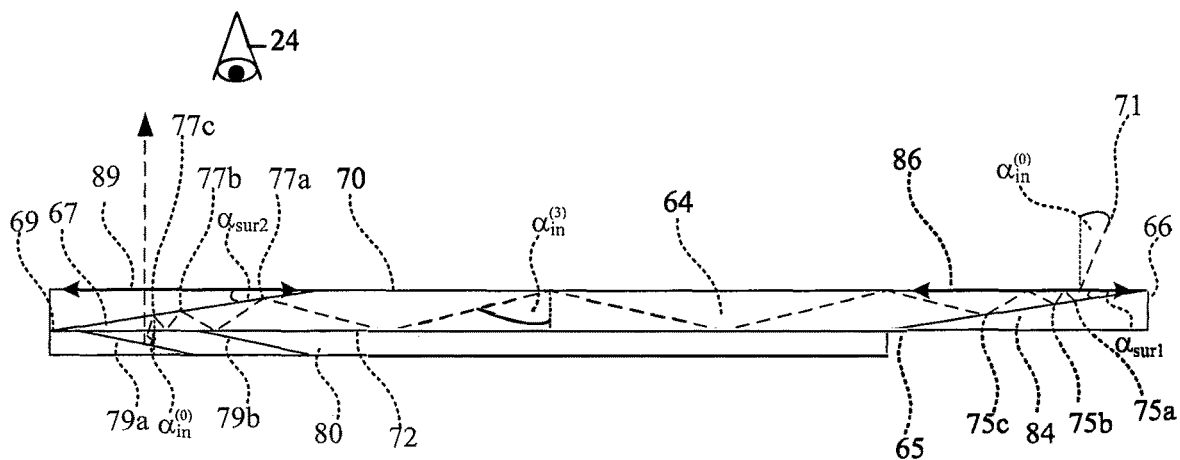
Figures 6A, 6B, 6C, 6D, 6E:
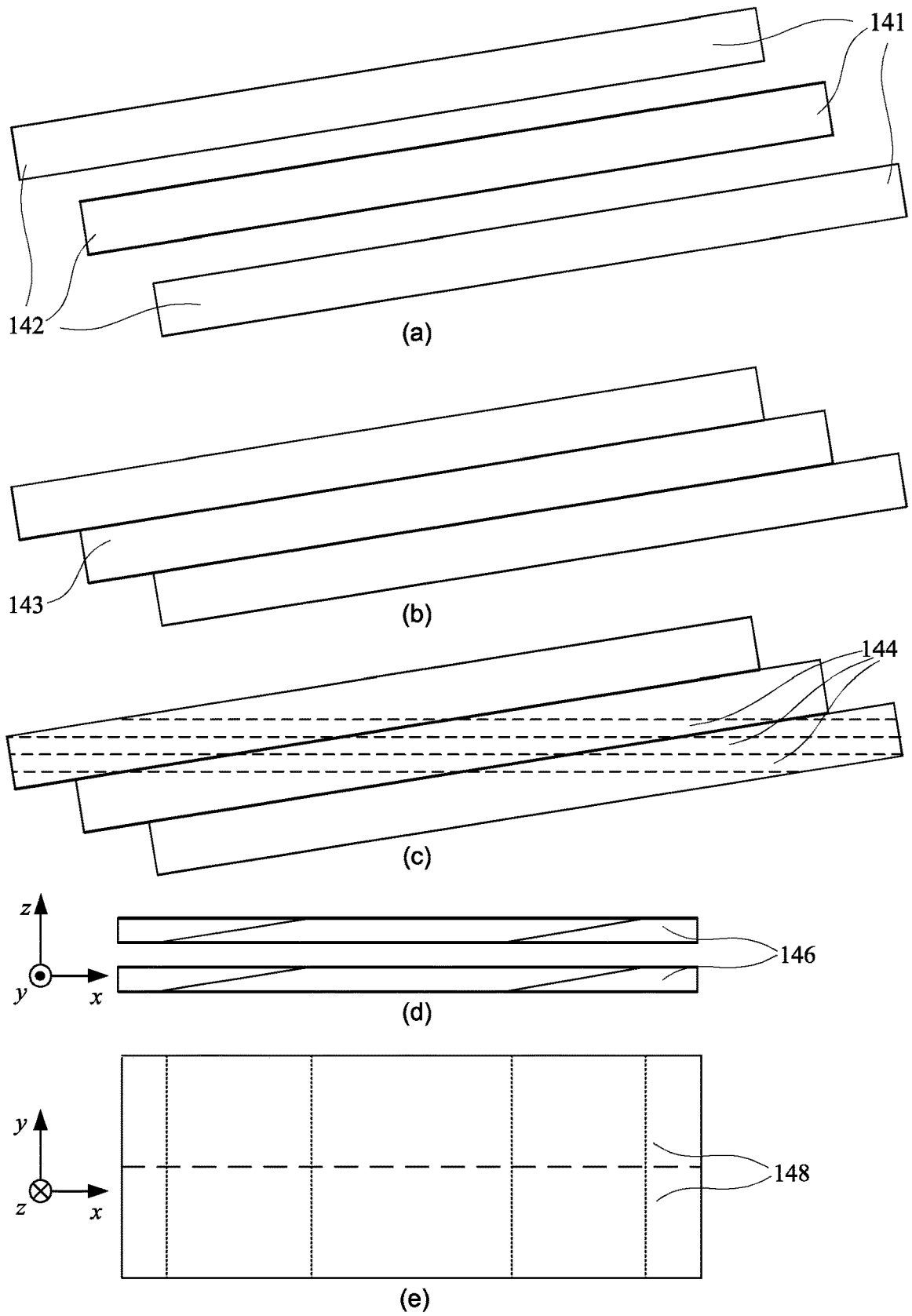
Figures 7A, 7B, 7C, 7D, 7E:
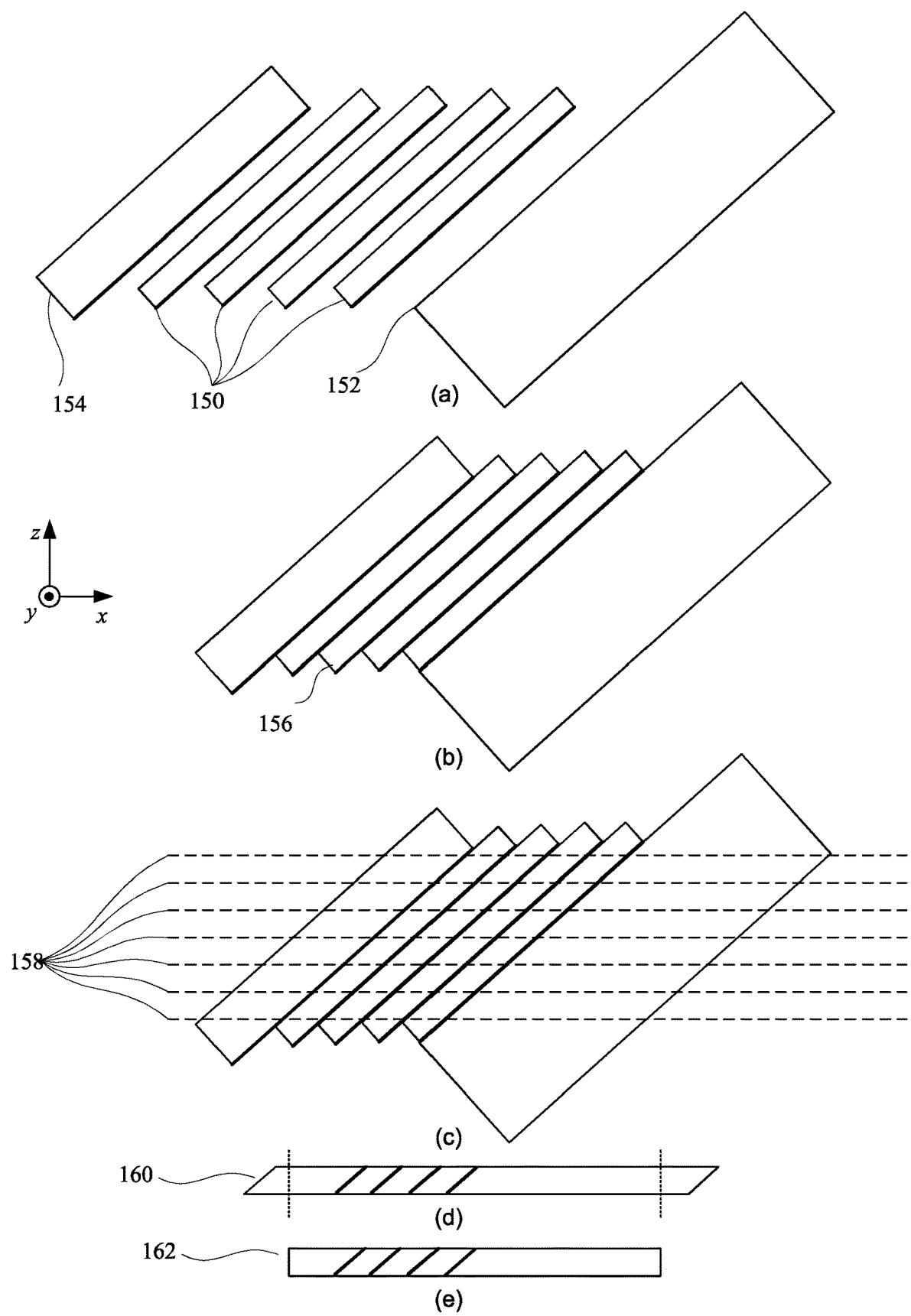
Figures 8A, 8B, 8C, 8D, 8E, 8F:
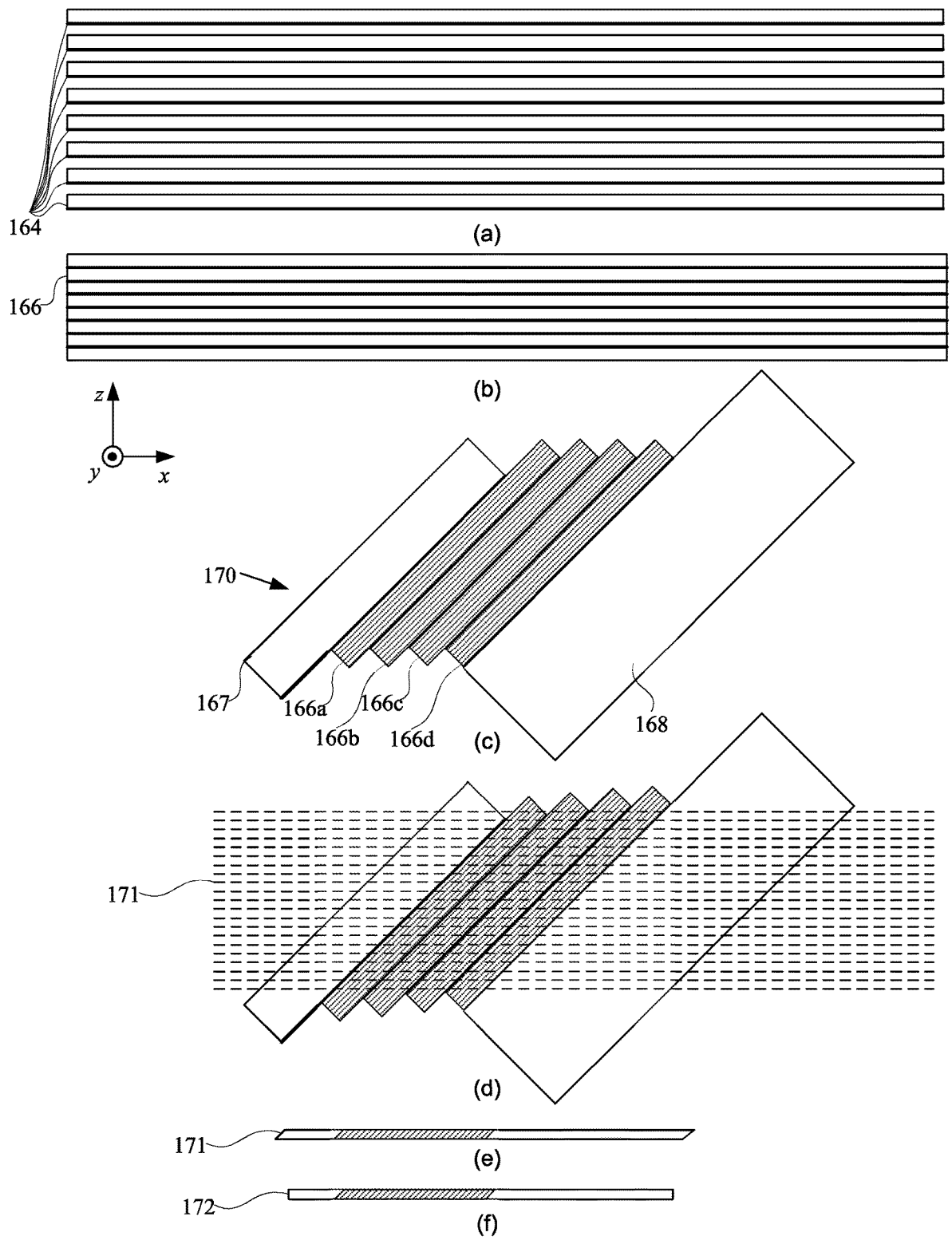

The exact cutting position 219 of the redirecting element 80 is not crucial, as long as the active section 228 redirects the coupled-out light waves from the coupling-out element into the entire area of the output aperture 89 (FIGS. 5A-5C). In addition, the border 229 between sections 226 and 228 is usually set as the intersection of the marginal ray, reflected from the coupling-out element 67, with the lower surface 70 of the substrate. There are systems, however, as illustrated therein, wherein the exact location of the cutting position 229 is critical and wherein the active section 228 can be extended beyond the limit described above.

FIG. 13A illustrates a prior art tracing-back of the three light waves from the EMB 100 toward the input pupil 86' of the substrate 64. As shown, the left marginal 307L, the central 307M, and the right marginal 307R light waves, respectively, pass through the input pupil 86' and impinge on the lower surface 72 of substrate 64. The light waves enter the substrate and pass through the coupling-in surface 65. Since the incident angles of the input light waves are substantially small and an AR coating is applied at surface 65, the reflectance of the light waves from this surface will be negligible. The light waves exiting the substrate 64, enter the intermediate prism 314 through its lower surface 316, which is attached to the upper surface 70 of the substrate, are reflected from the reflective surface 318, and re-enter the substrate 64 through the input aperture 86 at input angles of $\alpha_{in}^{(0)}$. The light waves now impinge on the coupling-in surface 65 having the incident angles of $\alpha_{in}^{(0)} + \alpha_{Sur1}$, which angles are higher than the critical angle and are coupled inside the substrate. The light wave 107L (dashed-dotted line) impinges on the right part of surface 65, trapped inside the substrate having an off-axis angle $\alpha_{in}^{(3)}$ after three reflections from surface 65, and is coupled out from the substrate after three reflections from the surface 67, wherein the third reflection that couples the light wave out of the substrate is at the left part of surface 67. The light wave 107M (dotted lines) impinges on the central part of surface 65, trapped inside the substrate having an off-axis angle $\alpha_{in}^{(2)}$ after two reflections from surface 65, and is coupled out from the substrate after two reflections from the surface 67, wherein the second reflection which couples the light wave out of the substrate is at the central part of surface 67. The light wave 107R (dashed lines) impinges on the left part of surface 65, trapped inside the substrate having an off-axis angle $\alpha_{in}^{(1)}$ after one reflection from surface 65, and is coupled out from the substrate after one reflection from the right part of the surface 67. The coupled-out light waves are partially reflected by the redirecting element 80, re-enter the substrate, pass through the coupling-out surface 67, exit the substrate through the output aperture 89, and impinge on the EMB 100.

As illustrated and explained in relation to FIGS. 13A-13D of Publication WO2020/157747, the lateral area of the input pupil 86' is substantially smaller than that of the output aperture 89. Nonetheless, for systems having wide FOV, it is occasionally required to expand the output aperture even more without increasing the input pupil. In the embodiments illustrated in FIGS. 13A-13C, the right edge 79R of the active section of element 80 is set by tracing the marginal right ray 307R from the right edge 67R of the coupling-out element 67 into the lower surface 70. The right edge 89R of the output aperture 89 is set by tracing this ray to the upper surface 72. Subsequently, the extent Sour of the output aperture 89 of the substrate is limited by the relation $$S_{out} < d \cdot \cot(\alpha_{Sur1}), \qquad (4)$$

wherein d is the thickness of the substrate, and hence the right term of Eq. (4) is the projection of the coupling-out element 67 on major surfaces 70, 72 of substrate 64. As a result, the active section and the output aperture are substantially smaller than this projection. It can be deduced from Eq. (4) that the output aperture, and therefore the EMB, will be extended by reducing $\alpha_{Sur1}$. In that case, the available FOV of the coupled light waves will also be reduced. It is also possible to increase the output aperture by increasing the thickness of the substrate, but the input aperture will also be increased accordingly. In addition, it is usually required that the substrate will be as thin as possible.

In the embodiment illustrated in FIG. 13A, the light waves 307R, 307M, and 307L are coupled after being reflected once, twice, and thrice from surface 65 and propagate inside substrate 64 having the first, second, and third propagation order, respectively.

FIG. 14 illustrates a method to increase the output aperture 89 without modifying the structure of substrate 64 by also utilizing the zero-order of at least part of the incoming light waves. As shown, k more partially reflecting surfaces 79i (i=j+1, . . . j+k) have been added to the redirecting element 80. The light ray 307Rn (solid line), which is parallel to the light wave 307R, enter substrate 64 through the input aperture 86 at the maximal input angles of $\alpha_{in}^{(0)}$(max). The light ray impinges on the lower surface 72 left to the intersection line 65L between surfaces 65 and 72. As a result, light ray 307Rn is not being reflected by surface 65. For systems having wide FOV, however, $\alpha_{in}^{(0)}$(max) can be higher than the critical angle, and hence, it is coupled by total internal reflection and propagating inside substrate 64, having the zero-order $\alpha_{in}^{(0)}$(max). The light ray enters the redirecting element 80 without being reflected from surface 67, is partially reflected by the redirecting surface 79j+k and re-enters the substrate. The light ray 307Rn does not pass now through the coupling-out surface 65. It exits the substrate at the point 89Rn located right to the edges 89R and 67R of the output aperture 89 and the coupling-out element 67, respectively. The light ray impinges on the plane of EMB 100 at a point 100Rn located right to the previous right edge 100R of the EMB 100. As a result, the limitation given in Eq. (4) is not valid anymore. The active section of the redirecting element 80 and the output aperture 89 are substantially larger than the projection of the coupling-out element 67 on the major surfaces 70, 72. As shown, the output aperture 89 has been significantly expanded by the distance between the two crossing points 89R and 89Rn. Moreover, the EMB has been expanded by the same extent—the distance between 100R (the previous edge of the EMB) and 100Rn.

As shown, the EMB 100 has significantly increased by using the zero-propagation order for at least part of the coupled light waves and increasing the redirecting element's active section. For the example illustrated on page 19, lines 1-10 of Publication WO2020/157747, the EMB is expanded by more than 5 mm. Alternatively, the output aperture can be kept at the same extent, and instead, the substrate's thickness d can be decreased, the eye-relief of the system can be increased, or the slanted angle $\alpha_{Sur1}$ of the coupling-in element 65 can be increased to expand the FOV of the system. Generally, the exact values of the output aperture, substrate thickness, and FOV will be set according to the system's specific requirements.

As illustrated in FIG. 14, the active section of the redirecting element 80 has been expanded by adding k other partially reflecting surfaces 79i (i=j+1, . . . , j+k). This expansion, however, is not unlimited. These additional surfaces are reflecting not only the marginal light wave 309R but a continuum 8 of light waves located in the spectral range between $\alpha_{in}^{(0)}$(max)−δ, and $\alpha_{in}^{(0)}$(max). As illustrated in FIG. 15, a light ray 320, traced backward for the EMB, is reflected by the partially reflecting surface 79j+1 and coupled inside the substrate having a zero-order propagation direction of $\alpha_{in}^{(0)}$(max)−δ. The light ray impinges on the upper surface 72 just right to the right edge 67R of the coupling-out surface 79. It continues to propagate at the same angle and impinges on the lower surface 70 at point 322. It is crucial that the light ray will not enter again element 80. Otherwise, the light ray will be partially reflected again, and the image will be distorted. As a result, the redirecting element 80 cannot be active at point 322, and the active supplement is limited to the k elements 79i (i=j+1, . . . j+k). Therefore, the extent A of this supplement is limited to $$A \leq 2d \cdot \tan(\alpha_{in}^{(0)}(\max) - \delta). \qquad (5)$$

In addition, the interface surface 323 between the substrate 64 and the element 80 at point 322 must be totally reflective for the zero-order propagating light waves. On the other hand, as illustrated, the reflected light ray 307Rn enters the substrate 64 at point 321 located just left to point 322. Consequently, the interface surface should be transmissive for the zero-order propagating light waves at this point. Subsequently, there should be a discontinuity in the interface surface between points 321 and 322.

A possible method to achieve the requested discontinuity is illustrated in FIG. 16A. As shown, element 80 has been cut between points 321 and 322. Therefore, the interface at point 322 is between substrate 64 and the air. The critical angle at this point is much lower than before, and all the zero-order light waves are totally reflected from the lower surfaces 72 as requested. As a result, the cutting lines 208 and 219, illustrated in FIGS. 11(f) and 12(g), respectively, should be located between the calculated points 321 and 322. The main problem with the proposed method is that it is not suitable for systems wherein external elements are cemented to the external surfaces 70, 72 of the substrate. These external elements can be either ophthalmic lenses or protective layers. In that case, the cementing process will eliminate the glass-air interface at the exposed part of surface 72 and terminate the total internal reflections of the zero-order propagating light waves inside the substrate.

An alternative method is illustrated in FIG. 16B. As shown, the redirecting element 80 is cut into two sections 324, 325 at the line located between points 321 and 322. These two parts are cemented together to substrate 64 at the lower surface 70 but using two different optical adhesives.

The active section 324 is cemented using an optical adhesive transparent for the zero-order angles of the coupled-in light waves and totally reflecting for the first-order propagating waves. The inactive section 325 is cemented to surface 72 adjacent to section 324, defining a new interface surface 326, using an optical adhesive reflective to the zero-order propagating light waves. Usually, there is no lower limit to the refractive index of this adhesive. For the example given hereinabove, the optical adhesives Norland NOA-148 and Norland NOA-140, having refractive indices of 1.48 and 1.40, are good candidates for the interface surfaces 323 and 326, respectively.

In the embodiment illustrated in FIGS. 15-16, the majority of the light rays are coupled into and from the substrate 64 by reflections from the coupling-in 65 and coupling-out 67 surfaces, respectively. The light waves 307R, 307M, and 307L are reflected once, twice, and thrice from surfaces 65 and 67, respectively. Other light rays 307Rn and 320 are coupled into and from the substrate having no interaction with these surfaces and are coupled inside the substrate having the zero-order propagation order. There are systems, however, wherein it is preferred to use only the zero-order. As illustrated in FIG. 17, substrate 330 is a simple blank transparent plate containing no internal reflecting surfaces. The light waves 331R, 331M, and 331L are reflected from the reflecting surface 332 of the folding prism 333 and coupled directly into the substrate. The light waves are reflected from the upper surface 72 and the interface surface 326. When they impinge on the interface surface 323, they enter the active section 324 of element 80 and are partially reflected from surfaces 79i. The light waves pass through substrate 330 and reach the EMB 100. Usually, the embodiment shown in FIG. 17 is appropriate for systems having limited FOV and small EMB, but their structure is straightforward, making them suitable for non-expensive niches.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method for manufacturing an optical device having a light wave transmitting substrate with at least two major surfaces, edges and an output coupling-out reflecting element carried by the substrate, wherein the major surfaces are parallel to each other and not parallel to the coupling-out reflecting element, forming a substrate allowing light-waves to traverse the substrate between the two major surfaces, the method comprising:
   a. attaching to each other a plurality of flat plates of a selected thickness, each including two parallel main surfaces and two lateral edges arranged in a first periodic stack;
   b. slicing the stack to form a plurality of slices defining slicing lines, the stack being oriented such that for the majority of the stacked plates, the slicing lines cross at least two lateral edges of the plate;
   c. grinding or polishing the slice to form a substrate with two major surfaces, and the coupling-out reflecting element, and
   d. cutting the substrate to final dimensions.

2. The method as claimed in claim 1, wherein the coupling-out element comprises at least one reflecting surface.

3. The method as claimed in claim 2, wherein the stack is sliced in a slicing device and the number of the plates is accommodated in the slicing device.

4. The method as claimed in claim 2, wherein the number of plates in the stack is substantially larger than the number of the reflecting surfaces in the substrate.

5. The method as claimed in claim 1, wherein at least a two-dimensional array of at least four substrates is cut-off from a single slice.

6. The method as claimed in claim 2, further comprising at least one prism having at least a first surface and a second surface, wherein the first surface is cemented to an edge of the first stack and the second surface is slanted at a second angle in relation to the first surface, the second angle being similar to the first angle.

7. The method as claimed in claim 6, wherein the second surface is slanted at a second angle in relation to the first surface, the second angle is similar to the first angle.

8. The method as claimed in claim 2, further comprising manufacturing a redirecting element having two major surfaces and a plurality of partially reflecting surfaces that are parallel to each other and not parallel to the major surfaces, for redirecting coupled-out light waves from the substrate into a viewer's eye:
   e. attaching to each other a plurality of flat plates having two sides arranged in a second periodic stack having at least two edges;
   f. cutting the stack to form a slice;
   g. grinding or polishing the slice to form a redirecting element;
   h. cutting the redirecting element to the final dimensions, and
   i. cementing the redirecting element to one of the major surfaces of the substrate.

9. The method as claimed in claim 8, wherein at least part of the plates is not coated and at least another part of the plates is double-sided coated by a partially reflecting coating, the uncoated and the double-sided coated plates are arranged in an interlaced arrangement in the stack, forming an interface plane between two adjacent plates.

10. The method as claimed in claim 8, wherein the uncoated and the double-sided coated plates are arranged in an interlaced arrangement in the stack, forming an interface plane between two adjacent plates.

11. The method as claimed in claim 10, wherein each interface plane contains a solely partially reflecting surface.

12. The method as claimed in claim 8, wherein the redirecting element comprises an inactive section, and an active section containing a plurality of partially reflecting surfaces that redirect the coupled-out light waves into the viewer's eye, the active section is substantially larger than the projection of the coupling-out reflecting element on the major surfaces of the substrate.

13. The method as claimed in claim 12, wherein the inactive and the active sections are cemented to a major surface of the substrate using two different optical adhesives.

14. The method as claimed in claim 8, wherein at least part of the coupled light waves is redirected into the viewer's eye without being reflected by the coupling-out element.

15. The method as claimed in claim 8, wherein a plurality of identical second stacks are cemented together in a staggered arrangement so as to form an inclusive stack.

16. The method as claimed in claim 1, further comprising a coupling-in reflecting surface embedded inside the substrate, slanted at a third angle in relation to the major surfaces, the third angle is substantially similar to the first angle.

17. The method as claimed in claim 1, wherein at least two edges of the stacked plates are aligned together to form at least two main flat sides of the stack, and the stack is oriented such that the slicing lines pass through the stack between the two main flat sides.

18. The method as claimed in claim 17, wherein the stack is oriented such that the slicing lines pass through the stack between the two main flat sides.

19. The method as claimed in claim 1, wherein two adjacent slicing lines are spaced apart at a constant distance and are proportional to the thickness of the plates.

20. The method as claimed in claim 1, wherein the slicing lines cross the plate edges substantially at the same locations for all the stacked plates.

\* \* \* \* \*